United States Patent [19]
Kalt

[11] Patent Number: 6,057,814
[45] Date of Patent: May 2, 2000

[54] ELECTROSTATIC VIDEO DISPLAY DRIVE CIRCUITRY AND DISPLAYS INCORPORATING SAME

[75] Inventor: Charles G. Kalt, Williamstown, Mass.

[73] Assignee: Display Science, Inc., North Adams, Mass.

[21] Appl. No.: 09/055,575

[22] Filed: Apr. 6, 1998

Related U.S. Application Data

[63] Continuation-in-part of application No. 08/871,486, Jun. 9, 1997, abandoned, which is a continuation-in-part of application No. 08/681,606, Jul. 29, 1996, Pat. No. 5,638,084, which is a continuation of application No. 08/228,111, Apr. 15, 1994, abandoned, which is a continuation-in-part of application No. 08/066,949, May 24, 1993, Pat. No. 5,519,565.

[51] Int. Cl.⁷ ........................................... G09G 3/00
[52] U.S. Cl. ........................ 345/58; 345/85; 345/31; 359/230
[58] Field of Search ............................ 345/31, 85, 58, 345/84, 87, 94, 95, 96, 208–210; 361/280–281; 359/227, 230; 340/825.79, 825.71; 313/459, 511

[56] References Cited

U.S. PATENT DOCUMENTS

| | | | |
|---|---|---|---|
| 4,336,536 | 6/1982 | Kalt et al. | 345/85 |
| 4,430,648 | 2/1984 | Togashi et al. | 345/205 |
| 4,794,370 | 12/1988 | Simpson et al. | 345/85 |
| 5,231,559 | 7/1993 | Kalt et al. | 361/301.5 |
| 5,233,459 | 8/1993 | Bozler et al. | 345/48 |
| 5,406,304 | 4/1995 | Shirayama | 345/98 |
| 5,469,020 | 11/1995 | Herrick | 313/511 |
| 5,497,146 | 3/1996 | Hebigushi | 345/92 |
| 5,519,565 | 5/1996 | Kalt et al. | 361/280 |
| 5,604,513 | 2/1997 | Takahashi et al. | 345/153 |
| 5,635,950 | 6/1997 | Okada et al. | 345/95 |
| 5,670,973 | 9/1997 | Bassetti, Jr. et al. | 345/100 |
| 5,786,797 | 7/1998 | Kapoor et al. | 345/209 |

*Primary Examiner*—Lun-Yi Lao
*Attorney, Agent, or Firm*—Handal & Morofsky

[57] ABSTRACT

Disclosed are cross-talk resistant drive circuitry for electrostatic video displays and flexible, foldable and shaped embodiments of such displays including books, fanfolds and scrolls employing flexible polymer film construction. Transitorless drive circuitry uses row and column dumping capacitors to charge electrostatic pixels in a traveling group to avoid simultaneously charging row-adjacent pixels. Also, individual pixels can be shielded each with their own Faraday cage to control charge leakage from the pixel. The pixels' have spiral rollout shutters whose time parameters can be controlled by the use of suitable bleed resistors. Low-cost film technology manufacturing methods are also described.

16 Claims, 8 Drawing Sheets

TRANSMISSIVE-REFLECTIVE ELECTROSTATIC PIXEL DISPLAY

- FLAT ILLUMINATION 158
- GLASS SUBSTRATE 160
- COLUMNS 162 OF TRANSPARENT FIXED ELECTRODES
- POLYPROPYLENE DIELECTRIC 32
- ROWS OF SPIRAL ROLLOUTS 20
- GAP 156
- TRANSPARENT COVER 52

← DIRECTION OF VIEW

Figure 4

REFLECTIVE ELECTROSTATIC PIXEL DISPLAY

- PLASTIC REINFORCEMENT 152
- ALUMINUM BACK PLATE 150
- METALLIZED POLYESTER COLUMNS 154 OF FIXED ELECTRODES
- POLYPROPYLENE DIELECTRIC 32
- ROWS OF SPIRAL 20
- GAP 156
- CLEAR COVER 52

← DIRECTION OF VIEW

Figure 3

ELECTROSTATIC VIDEO DISPLAY DRIVE CIRCUITRY AND DISPLAYS INCORPORATING SAME

CROSS-REFERENCE TO RELATED APPLICATIONS

This application is a continuation-in-part of Kalt patent application Ser. No. 08/871,486 filed Jun. 9, 1997, now abandoned which is a continuation-in-part of Kalt patent application Ser. No. 08/681,606 filed on Jul. 29, 1996, now U.S. Pat. No. 5,638,084 dated Jun. 10, 1997 which, in turn, is a continuation of Kalt patent application Ser. No. 08/228,111 filed Apr. 15, 1994, now abandoned which in turn is a continuation-in-part of patent application Ser. No. 08/066,949 of Kalt, filed May 24, 1993, now U.S. Pat. No. 5,519,565. The instant application claims continuation status from said applications, Ser. Nos. 08/871,486, 08/681,606, 08/228,111 and 08/066,949. Another, earlier filed application, being a parent application to the aforesaid applications, issued to U.S. Pat. No. 5,231,559, but continuation status is NOT claimed from such other earlier filed application, at this time. The disclosures of U.S. Pat. Nos. 5,638,084, 5,519,565 and 5,231,559 are hereby incorporated herein by reference thereto. These three patents are referenced hereinbelow as "the parent patents".

BACKGROUND OF THE INVENTION

1. Field of the Invention

The present invention relates to electronically driven displays that can translate electrical signals into changeable static images or dynamic video images, and includes multicolor and full color displays. Such displays, or display screens, can comprise a pixellated screen formed by a multitude of individual, selectable state, light-modulating picture elements that can be controlled to provide text or graphic images. More particularly, the invention relates to electrostatic displays which employ capacitive pixels having light-modulating, movable electrodes that can adopt a number of positions, at least one of which is a position extending across the path of a light beam traveling through the pixel. By selective actuation of the movable electrode to interrupt the light beam to a greater or lesser extent, and to change the appearance of individual pixels, groups of such capacitive pixels in the display can be composed into meaningful images.

2. Description of Related Art Including Information Disclosed Under 37 CFR 1.97 and 37 CFR 1.98

The above-mentioned parent patents describe, inter alia, a number of capacitively driven, or electrostatic, pixellated video display inventions including, as disclosed in U.S. Pat. No. 5,638,084, an indoor-outdoor multicolor display viewable by transmitted or reflected light. Each pixel of the display employs a movable electrode which, in preferred embodiments takes the form of a miniature metallized plastic coil or spiral while in a relaxed condition. Application of an electrical pulse between the coil and a fixed electrode located on the other side of a dielectric layer from the coiled movable electrode, (termed a "spiral rollout" herein), causes the coil to unfurl across the dielectric layer to modulate light rays striking the pixel, e.g. to block or reflect, them. In effect, the spiral rollout acts as a shutter for the pixel.

Such electrostatic, pixellated displays have advantages of low power consumption, low heat output, and low cost and in some embodiments, of being able to display brilliant reflective images that are viewable outdoors in daylight. Furthermore, preferred embodiments of such electrostatically driven displays are susceptible to mass production from suitable treated low cost polymer film materials. U.S. Pat. No. 5,638,084 disclosed a full color video display viewable indoors or outdoors, wherein a mosaicked color screen is aligned behind a black screen comprised by an array of electrostatic shutters each of which registers with a colored or white mosaic element in the color screen.

Suitable drive circuitry for such displays is known, for example, from U.S. Pat. No. 4,336,536 to Kalt and Babcock ("Kalt and Babcock" herein) which discloses drive circuitry for a pixel display panel which permits selective pixel actuation in rapidly changing, desired groups and patterns of spiral rollouts. Disclosed is a half select row and column drive system, operating in response to timing information extracted by a sync circuit, video information from an incoming signal is supplied to a shift register for loading into columns coupled to the fixed electrodes of the pixels, while row synchronization of the movable electrodes is maintained by a ring counter operating in combination with a plurality of gates, one for each row. The outputs of the column-driving shift register and the row-synchronizing gates are applied directly to the pixels without interposition of further circuit elements.

Kalt and Babcock provides an effective drive system for electrostatic displays, especially displays employing relatively large pixels. One drawback of the system relates to high-resolution or small-pixel displays, e.g. computer or television monitors, where the numbers and density of pixels to be addressed raise potential difficulties in multiplexing the pixel array with an adequate refresh rate, and of possible cross-talk between pixels in adjacent rows or columns leading to unintended actuation of one or more pixels.

The cycle times of electrostatic pixels employing spiral rollout electrodes, of a size of interest for modern video displays, for a cycle including application and removal of an activation voltage, and mechanical rollout and retraction of a coiled electrode, are typically measured in milliseconds, while desired refresh rates are currently at least 30 Hz and for some applications 60 Hz or higher. Since even an EGA screen resolution of 640×480 pixels contains over 300,000 pixels, it is not practical to allocate a unique time slice to cycle each pixel individually and still achieve the desired refresh rate. The problem is compounded for higher resolutions such as VGA, super VGA and HDTV and for higher refresh rates.

In such higher resolution displays, where row and column conductors are close together, there is a risk that one or more pixel shutters will undesirably respond to a switching signal intended for an adjacent or nearby pixel. It would be desirable to provide suitable drive circuitry which were resistant to cross-talk, even when the display has very small pixels, e.g. 0.01 inches (about 250 microns) or less.

The electrostatic displays described above are suitable for a variety of applications, for example, desktop and notebook computer screens, television receivers, conference room or assembly hall presentation screens, instrumentation displays, sports stadium displays (including "scoreboards" with video presentations) and outdoor signage, e.g. highway condition informational signs, as well as smaller personal informational display devices or computer "appliances" such as personal digital assistants, game-playing devices, Internet-enabled cellular phones and so on. Such devices, as they have been known prior to the present invention, because of the limitations of their underlying pixel technology, employ more or less planar or, in the case of cathode ray tubes, mildly curved, fixed form display screens mounted in protective structural frames. The curvature in cathode ray tube displays is usually considered undesirable, and being convex to the viewer, is visually inappropriate, but is more economical and practical for cathode ray technology than are flat-screen displays. Thus, conventional, commercially available displays provide physical restraints which limit the possible range of new devices that may be developed as display-utilizing technologies evolve. For example, a pocket-sized computer device with a form factor of say 8 inches by 4 inches (approximately 20 cm by 10 cm), yet which has a 9-inch (approximately 22.5 cm) diagonal screen is not believed possible with such commercially available displays. To the best of applicant's knowledge and belief, using conventional technology, the display area of such a device, even ignoring customary margins to the display area, can be no more than the form factor itself, namely, 32 $in^2$ (about 80 $cm^2$). Therefore, it would be desirable to provide a display which can be embodied in a device providing a display area in use which is larger than the form factor of the device in storage, the term "form factor" being used to reference the largest of the various possible two-dimensional projected profiles of the device.

SUMMARY OF THE INVENTION

The invention solves a problem. It solves the problem of providing an electrostatic display with drive circuitry which can drive high resolution displays with desirable refresh rates and which furthermore is resistant to cross-talk, especially in small pixel embodiments. This problem is solved either by providing self-shielding pixels each having its own Faraday cage, or by employing a unique traveling pulse to address the display raster and apply charge to every pixel to be activated on a given refresh cycle. These innovations are quite compatible, one with the other and may be combined in a display structure, if desired. Also, the invention solves the problem of providing a video display with a large display area relative to its form factor.

Thus, in one aspect of the invention, as applied to a display having a an array or raster of pixels each comprising an electrostatically movable, light-modulating electrode, for example, a spiral rollout, each individual pixel comprises a Faraday cage extending around the zone occupied by the pixel's movable electrode to shield the movable electrode and reduce cross-talk or cross-coupling between adjacent pixels, which may adversely affect the quality of the displayed image.

Thus each pixel may be self-shielded with its own Faraday cage and, in a row and column display, wherein each pixel has an electrode on either side of a transparent dielectric, can be activated with a front lateral potential and a back vertical potential applied across the dielectric.

This aspect of the invention solves prior problems of lateral charge pollution which have arisen in conventional displays wherein pixels are not shielded. The solution of providing the pixels with individual Faraday cages, rings or margins, is uniquely applicable to electrostatically driven displays.

In one embodiment, such a Faraday cage can created by providing the or each pixel, or each alternate pixel, with a fixed electrode which is larger than the extended movable electrode and which has a marginal zone around its periphery extending laterally beyond the area of the movable electrode in its extended or shuttering position, for example, a fixed electrode opposed to a rectangular spiral rollout, in a row and column display, can have horizontal extensions running between the rows and vertical extensions running between the columns, so that all four sides of the rectangular rollout are shielded. Other configurations of rollout can be shielded by correspondingly shaped and dimensioned fixed electrodes providing extended marginal zones along one or more sides or extensions of the rollout's excursion area, as will be apparent to those skilled in the art.

To solve the problem of providing an electrostatic display with drive circuitry which can drive high resolution displays with desirable refresh rates, the invention provides in one aspect, an electrostatic display comprising:

a) an array of pixels each including a capacitively drivable electrode shutter movable between an open, light-transmitting position and a closed, light-blocking position and being mechanically retractable to a starting position; and b) drive circuitry for the pixel array capable of applying control signals to selected pixels to move selected individual ones of the electrode shutters between their respective open and closed positions wherein the drive circuitry is operable to charge each selected pixel in a relatively short charging interval and to discharge each selected pixel in a relatively longer discharging interval. Preferably, the ratio of the discharging interval to the charging interval is at least 5:1, more preferably at least 50:1 and still more preferably, at least 500:1. By employing a strongly asymmetrical charge:discharge cycle, the invention permits large numbers of pixels to be charged while others are discharging, enabling the complete array to be charged, or addressed for charging if so selected by suitable software drivers, in small enough time slice, e.g. in $\frac{1}{20}$, $\frac{1}{60}$ second or less, to provide a desired refresh rate.

In a preferred embodiment of the invention, the drive circuitry effects charging by applying a short charging pulse to one or more pixels to be charged, the charging pulse having a pulse width determining the charging interval. Preferably the charging pulse is applied to a dumping capacitor servicing a group of pixels, for example a row or column of pixels, and the dumping capacitor is connected to charge each and every specfied pixel in the pixel group on each refresh cycle. Because the charge interval is much shorter than the discharge interval and because no turn-off pulse is required to retract an extended electrode, the charging pulse need not be applied progressively to every designated pixel in the raster during each refresh cycle, but may jump around the display or be applied to one or more groups or rows of pixels in a spatially non-sequential manner, provided that all pixels designated for activation can be charged in a given refresh cycle.

Preferably, the drive circuitry further includes a number of bleed resistances for draining charge from the pixels and each pixel is connectable with one of said bleed resistances to drain charge therefrom. Furthermore, the value of each bleed resistance can be selected, in relation to the capacitance characteristics of the pixel, to determine the duration of the discharge interval. By also taking into account the mechanical characteristics of the movable electrode, an optical ON duration of the pixel, in which the pixel shutter is closed can be determined by appropriate selection of the value of the pixel's bleed resistance. Commonly, the pixels will be identical one with another, save for their array location, and each will be connected with, or connectable with, the same value of bleed resistance so as to have substantially the same electro-optical characteristics. However, the invention is not so restricted in its application and offers possibilities of varying the bleed resistance as between one or more pixels or groups of pixels in the array and other pixels in the array to provide different ON durations, for special purposes.

In another aspect the invention provides, to solve the problem of reducing or eliminating cross-talk, an electrostatic video display comprising a raster of capacitive light pixels and having a row dumping capacitor connected to each row of the raster to facilitate charging of the pixels in the row. The dumping capacitor preferably has a capacitance comfortably exceeding the sum of the capacitances of the pixels in the row to which it is connected so that it can rapidly receive a charging pulse and subsequently disseminate the charge to individual pixels in the row over a relatively longer time period.

In a still further aspect, the invention provides a cross-talk resistant electrostatic video display comprising a raster of rows of capacitively driven light-modulating pixels having distinct, logical pixel addresses, and drive circuitry to provide charging pulses to selected pixels according to an intended display image, wherein the drive circuitry provides an image refresh cycle and generates in each cycle, a traveling pulse which scans the raster, encompassing every pixel address once every cycle. In one preferred embodiment, the traveling pulse advances through the raster in a progressive manner traveling sequentially along one row and then to the next adjacent row until the complete raster has been scanned. Preferably, the traveling pulse traverses each row in the same direction, rather than moving sinuously across the raster, and avoids simultaneously addressing a given column address in adjacent rows, so as to reduce the probability of inadvertently activating a pixel not specified for activation in the video software or signal.

Thus, a pixel-charging activation pulse can be applied to all specified ones of a horizontally contiguous pixel group, wherein the pixel group moves progressively from row to row across the raster to visit every pixel address during each refresh cycle, the number of pixels in the group preferably being substantial, e.g. 10 or more, but being substantially less than or, at most, equal to the number of pixels in a row, so that specified row-adjacent pixels receive charging pulses at different times, whereby cross-talk is inhibited.

Effectively, the invention provides, in this aspect, a row-sequential charging system which reduces the risk of cross talk by avoiding simultaneously delivering a charging pulse to pixels with the same column address in adjacent rows, while avoiding the delays that would occur if the pixels were charged one at a time. However, some pixels at one end of one row may be charged at the same time as some pixels at the other end of an adjacent row are being charged, so long as there is no overlap with respect to the columns. Alternatively, the traveling pulse could be applied to the columns. It will be appreciated that for the purposes of the present invention, the rows and columns may be logically interchangeable, subject to the requirements of the video signal which usually scans horizontally. In either configuration, cross talk is avoided by the invention, by maintaining a spatial or temporal separation of pixels receiving a charging pulse so that the act of charging one, or more significantly, several adjacent pixels in one row, (or column) does not trigger a quiescent pixel in an adjacent row (or column respectively).

As an alternative to a row-sequential charging regimen, the pulse could jump around the raster being applied to different groups of pixels in turn according to a random or organized pattern. The ability to charge a pixel very quickly enables complex, randomized, or partially randomized, charging patterns to be employed wherein, for example, an individual pixel, or small group of possibly non-adjacent pixels in a first portion of the raster is pulsed, then left to unfurl while another pixel or group in a second portion of the raster, which may be remote from the first portion of the raster, is pulsed in its turn, and so on until the complete raster is addressed pursuant to the randomized or partially randomized pattern. It will generally be more convenient to repeat the pattern in each refresh cycle, but variations may be made as will be apparent to those skilled in the art. A suitable group size will also be apparent to those skilled in the art and may for example comprise from about 0.001 percent to about 5 percent of the total number of pixels in the display, preferably about 0.05 to about 1 percent. If desired, the group can be an organized group, for example a geometric sub-unit of the complete display raster, for example a rectangle, triangle, hexagon or a complete row or column, and not all groups need have the same number of pixels or geometric character. To use illustrative language, the pulse can be envisaged as hitting a few pixels in one place, delivering a charge then vanishing to hit a few pixels in another place, and then another in a fast-moving, more or less complex, randomized pattern.

Preferably, the circuitry component characteristics are selected so that the complete display area can be refreshed within a desired interval, for example, for a typical desktop computer, or domestic television display, at least every one-thirtieth ($\frac{1}{30}$) of a second, although a refresh rate of 60 or even 100 or more hertz is more preferable.

typically, each pixel comprises a movable electrode and a fixed electrode and in this case a further preferred feature of the inventions is to connect the movable electrode to the drive circuitry through a bleed resistor or other means or device to delay bleed-off of charge from the pixel. If desired, a radio frequency choke can be provided for each pixel row to inhibit drive pulses from traveling in an unintended row.

Pursuant to the invention, it has been found that the mechanical response of a spiral rollout, a preferred configuration of movable electrode in an electrostatically driven display, exhibits in its mechanical response, a hysteresis lag behind applied electrical driving voltages. Thus, the rollout does not begin to uncoil from its coiled-up, relaxed state, until an activation threshold voltage is reached, whereupon the mechanical response continues after the charge is removed. The charge necessary to effect complete extension of the rollout (to close the shutter and render the pixel reflective) can be applied in a very short interval, perhaps a few microseconds, while the mechanical extension of the electrode induced by application of the charge may have a much longer duration, perhaps a number of milliseconds. The present invention exploits such electromechanical hysteresis characteristics in novel ways to provide beneficial new constructions of display that are not possible with conventional non-electrostatic displays, such as cathode ray, liquid crystal, active matrix and so on, which do not exhibit such characteristics. A further advantage of employing as movable electrodes mechanically biased spiral rollouts is that no negative pulse is required to retract the shutter, which enables simplified drive circuitry to be employed. When the charge decays to a release point below threshold, the extended electrode simply rolls up under the mechanical stresses induced in manufacture, which bias it to a coiled, retracted configuration.

Thus, unlike other types of display, in an electrostatic display employing movable pixels, a biasing voltage can be used. For example, referencing a row-and-column display, each row of pixels can be supplied with a biasing direct current voltage to a value below or near a pixel activation threshold to reduce the required drive signal voltage.

The several aspects of the invention are well adapted to be embodied in displays wherein the pixels are organized in an orthogonal array and a half-select drive system is employed. In such displays, the fixed electrodes can be connected together in columns extending transversely of the pixel rows, preferably located behind the dielectric, from the viewer's perspective, while the movable electrodes are connected together in rows. The timing and level of the applied voltage are selected on a row-by-row basis so as to apply a proportion of the applied voltage, for example half, to columns with an active address and then to apply a desired complementary voltage to the row so that all pixels in the row with an active address are charged. To achieve the desired traveling pulse effect of the invention, it may be preferable first to apply the row voltage, and then to apply the column pulses in sequence as a traveling group moving from one end of the row to the other.

To facilitate the process of charging specified pixels, the drive circuitry preferably further includes a column dumping capacitor for each column of pixels and a drain resistor connected in parallel across the column dumping capacitor to leak charge across the dumping capacitor and drain static build up.

In preferred embodiments, the drive circuitry includes a power source and, for each row and transverse column of pixels, a clock switch to connect the row or column to the power source. If desired, the whole display can be enclosed in a Faraday cage to inhibit stray external electrostatic events from interfering with proper operation of the display.

Larger displays, such as those for a theater, sports stadium or outdoor arena, can be constructed as a large matrix divided into rectangular panels that are separately driven and electronically pasted together to generate a coherent image.

In another aspect, to solve the problem of providing a portable display device having a useful display area which is larger than its form factor (the device's largest projected profile or footprint) in a closed, or out-of-use configuration of the device, provides a display with a variable configuration viewing or image area incorporated in a flexible, foldable or bendable structure providing the viewing area, whereby the display can adopt a compact out-of-use configuration, and can be opened up to provide an extended display area. A simple example of such a display is a book-like device, e.g. a notebook computer, wherein the display area extends across both leaves of the book to provide an area greater than an individual leaf. The invention also provides a display which is shaped rather than flat, or both flexible and shaped, and is a non-planar, thin-panel video display which may comprise a display raster, or matrix. In a preferred embodiment, such a shaped or flexible display comprises a polymer film laminate of electrically addressable and activatable pixels.

Preferably, the pixels of such a variable form display are electrostatically actuated and the polymer film laminate comprises a first polymer film providing a dielectric layer, a pattern of fixed electrodes contacting said dielectric layer and a second polymer film providing a movable electrode layer wherein the movable electrode layer comprises a corresponding pattern of movable electrodes to the pattern of fixed electrodes, the movable electrodes being movable across a light path through the pixel to modulate light rays traveling on said light path.

While consistently with the teachings of the present invention, display constructions employing electrostatically actuated pixels are preferred for the advantages they bring, those skilled in the art may, with the benefit of the teachings herein, devise other video displays which can be embodied in shapable or flexible materials for example polymer films and such other video displays having a useful shaped or flexible configuration are contemplated as coming within the purview of the present invention.

As referenced above, a preferred configuration of movable electrode for use in the above-described aspects of the invention comprises a spiral rollout pre-stressed to a coiled-up position. As is known from my prior patents and applications, such a spiral rollout can be provided with a metallic coating on a surface facing the dielectric so that application of a suitable charge to the capacitive pixel causes the spirally wound electrode to be attracted to the dielectric and to roll out, closing the shutter. This device has the advantage that no negative pulse is required to retract the shutter to an optically open position. When the charging pulse is released, or decays, the electrode rapidly retracts to its coiled-up position, in a spring-like manner. Additionally, the coiled electrode has a small footprint in its retracted position compared with its extended position so that there is little passive or dead space within a display perimeter and the active pixel areas fill a high percentage of the occupied display area. For example, smaller spiral rollouts may have lengths 10 or more times their retracted diameters, while for larger rollouts the proportion may be 100 or more.

Other configurations of movable electrode suitable for operation in an electrostatic pixel will be apparent to those skilled in the art, or may be developed, for example equilateral triangular rollouts organized in hexagonal arrays and "flapper"-type pixels, the latter of which are known and have been utilized in outdoor displays.

BRIEF DESCRIPTION OF THE DRAWINGS

One way of carrying out the invention is described in detail below with reference to the drawings which illustrate one or more specific embodiments of the invention and in which:

FIG. 3 is a schematic sectional view of a reflective mode electrostatic video display embodiment of the invention;

FIG. 4 is a schematic sectional view of a transmissive-reflective mode electrostatic video display embodiment of the invention;

DESCRIPTION OF THE PREFERRED EMBODIMENTS

Figure 1:
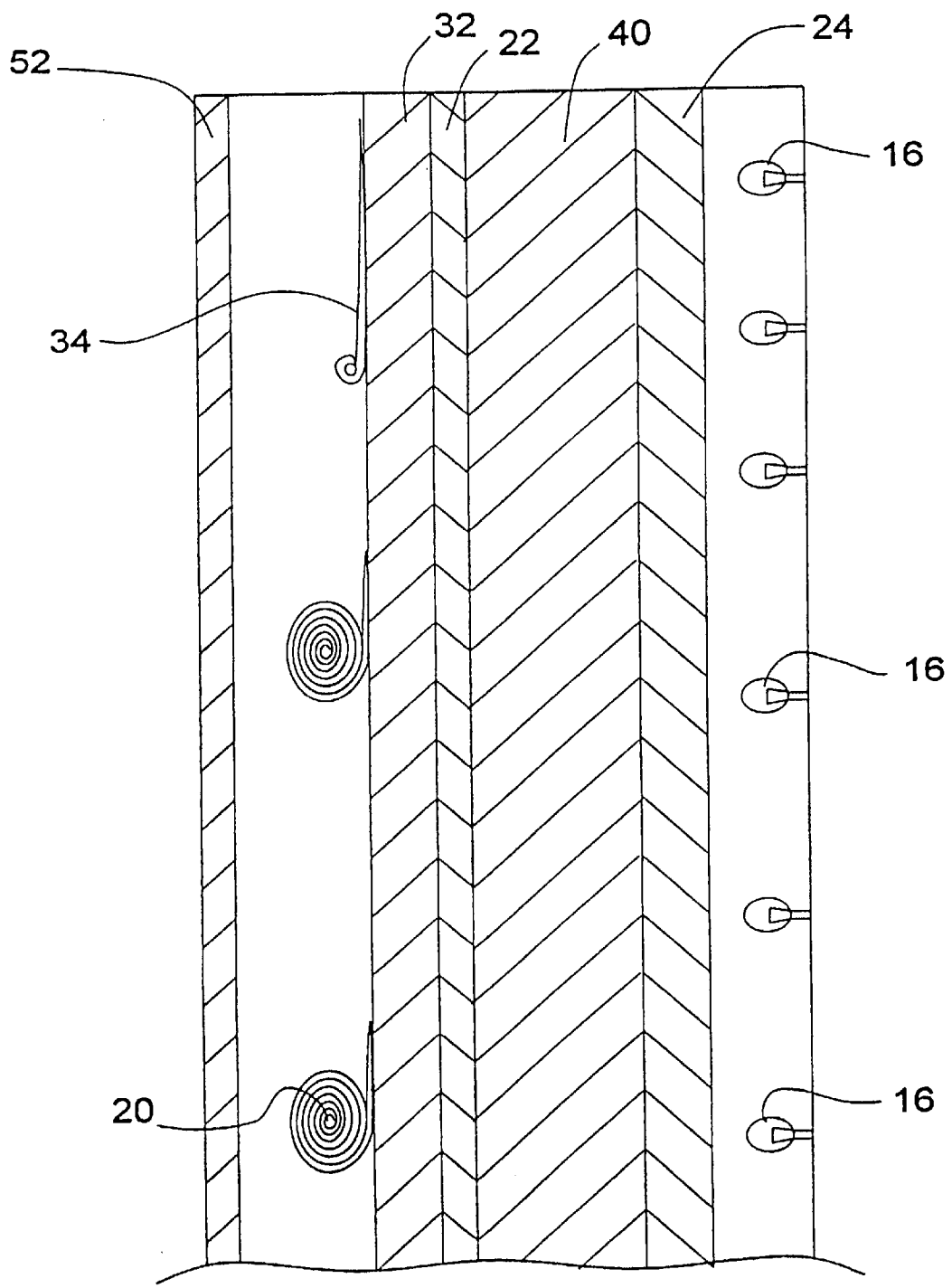
FIG. 1 is a partial sectional view of one embodiment of a layered structure, flat, thin panel, video display comprising a raster of electrostatically actuated pixels.

FIG. 1 corresponds with FIG. 3 of parent U.S. Pat. No. 5,638,084 and shows a layered structure of electrostatic display matrix as disclosed therein. Referring to FIG. 1, the display shown comprises a matrix layer 18 of metallized movable electrodes 20, ("spiral rollouts 20" hereinafter); a control electrode layer 22 of transparent fixed electrodes; and a color screen 24 which is both transparent and reflective and can display differently colored areas with comparable appearances in both transmissive an reflective modes. A transparent dielectric layer 32 is interposed between matrix layer 18 of spiral rollouts 20, which can roll out onto the dielectric, and control electrode layer 22, whereby individual indicating or shuttering capacitors are formed by each movable electrode constituted by the spiral rollouts 20, and a corresponding fixed electrode, across dielectric layer 32.

Matrix layer 18 of spiral rollouts 20 will usually be protected by a transparent cover 52 of high light transmissivity, for example a scratch-resistant rigid polymeric material such as PLEXIGLASS (trademark), or LUCITE (trademark), although glass may also be used, especially where high manufacturing temperatures are encountered or scratch-resistance is paramount. Cover 52 can, if desired, be rendered conductive, or provided with a transparent conductive coating, to provide, or complete, a Faraday cage to protect against electrostatic interference. The volume in which electrodes 18 move can be evacuated, if desired, but this is not believed necessary in most embodiments. However, some degree of sealing against ambient conditions, or even evacuation, may be helpful in improving performance under humid conditions, since undue humidity may affect the electrostatic characteristics of one or more individual pixels. High value embodiments, or those intended for stringent conditions may have gas-tight, preferably moisture-resistant, seals, and may be evacuated, or filled with dry air or an inactive or inert gas, if desired.

One suitable transparent conductive material which can be used for the fixed electrodes in control layer 22, or for coating or providing cover 52, is indium tin oxide. Others will be known or become known to those skilled in the art, for example a proton-doped polyaniline material, such as disclosed in U.S. Pat. Nos. 5,618,469 or 5,626,795.

Light traveling on a transmissive light path proceeds from back lighting 16 through color screen 24, through control electrode layer 22, and through matrix layer 18 to viewer 12. Light traveling along a reflective path proceeds as an incident ray, which is transmitted through matrix layer 18, and through control electrode layer 22 to a front surface 30 of color screen 24 where it is reflected (and possibly modulated, for example to color the light ray). The reflected ray is transmitted back through control layer 22, and through matrix layer 18, to the viewer 12.

Spiral rollouts 20, in matrix layer 18 are arranged so that when all electrodes are extended they form a flat open screen, for which purpose they are preferably colored or coated with a black colorant or coating material, for example, black ink to provide a uniform black display screen. Matrix layer 18 also incorporates a sheet of a transparent dielectric 32 of any suitable non-polar material, for example a polyetetrafluoroethylene homopolymer or copolymer material, e.g. TEFLON (trademark DuPont), or polypropylene. Spiral rollouts 20 have a conductive, metallized electrode coating which is brought into contact with a front surface of transparent dielectric 32 when the spiral rollout is in an extended position. This metallized coating serves as a variable electrode having a contact area with dielectric 32 which changes in size as the electrode 20 coils and uncoils, varying the capacitance of the pixel.

Preferably, spiral rollouts 20 are plastic elements that are prestressed into coils or spirals. While a conductive plastic material, without metallization, could be used for spiral rollouts 20, such material lacks the manufacturing advantage provided by metallized plastic rollout elements which can be readily prestressed by heat tentering. A metallized polyester film, metallized MYLAR (trademark DuPont) film, is one preferred material, metallized polyethylene naphthalate ("PEN" herein) is another, and a layer of electrodes 20 can conveniently be manufactured out of a single, possibly continuous sheet of such metallized film material by tentering the film, laser etching, scoring, or otherwise abrading outlines of electrode patterns partially through the film, then curing the film to cause individual electrodes 20 to be formed by curling up out of the sheet, as is described more fully in parent U.S. Pat. No. 5,519,565.

Preferably, spiral rollouts 20, transparent dielectric 32 and the control electrode layer 22 are all formed of thin film-like materials, in which case it may be desirable to provide a relatively rigid, clear substrate layer 40 to serve as a support for these layers. Substrate layer 40 is preferably incorporated between control electrode layer 22 and color screen 24, but could conceivably be incorporated behind color screen 24, as seen by a viewer to the left of the display as shown in FIG. 1. For a flexible, foldable or shaped display, substrate layer 40, if present, should also be flexible or otherwise shapable. It will be apparent that any such substrate layer 40 should be as transparent as practicable and can accordingly be formed of glass or suitable polymer or copolymer materials, as known to those skilled in the art, for example, polypropylene, polyethylene or polyethylene terephthalate.

Spiral rollouts 20 can be anchored to transparent dielectric 32 by lines of low resistivity adhesive (not shown), and additional conductive means, for example a wire, may be provided, if desired, to conduct a drive signal along a row of spiral rollouts 20.

Typically, the mechanical response of the spiral rollouts 20 employed in the invention exhibits a hysteresis lag behind applied electrical driving voltages, whereby the device does not begin to uncoil from the coiled-up state until an activation threshold voltage is reached. Thereupon, the uncoiling electrode moves rapidly to a fully or partially extended position, (depending upon the characteristics of the applied waveform) where it remains until the voltage is decreased (for example as the charge drains off through bleed resistor 20) to a value below a release threshold voltage, whereupon the rollout retracts and rapidly rolls up again. Since, (depending upon the particular pixel parameters) actuation voltage threshold may be as high as several hundred volts, use of a biasing voltage is desirable, enabling the required row and column driving voltages to be within a range suitable for operation using commercially available integrated circuit drivers developed for conventional electroluminescent displays.

Since the release threshold voltage may be substantially lower than the activation threshold voltage, it is possible to bias the driving voltage to a point between the activation and release thresholds. However, a preferred operating mode, pursuant to the present invention, biases the applied voltage to a point sufficiently below the activation voltage threshold such that no pixel is activated inadvertently and then effectively removes the applied voltage, leaving the coiled electrode to retract in its own time, as its holding charge decays. To this end, the biasing voltage may lie in the range of 60 to 90 or 95 percent of the activation threshold, preferably 75 to 85 percent of the activation threshold voltage.

Employing the novel drive circuitry disclosed herein, such displays can be produced in embodiments that are readily multiplexible, that respond repeatedly to pulses as narrow as 2 microsecond, or less, in a repeatable matter with a very high turn-on to turn-off optical ratio.

The high degree of multiplexibility permits resolutions of the order of VGA to be embodied in flat panel displays covering a full range of devices from small portable applications with, for example 5 inch (12.5 cm) screens or smaller, for personal assistants and other information appliances to large command and control or HDTV applications with screens as large as 40 inches (100 cm) or greater.

Thus, high contrast, high-resolution multiplexed flat panel displays can be provided which, as compared with conventional active matrix and LCD displays, may have favorable costs and low power consumption. The pixel rasters of displays described herein can be formulated without use of semiconductor manufacturing processes and are therefore well adapted to production in larger sizes than the limitations of semiconductor manufacturing permit.

Desirable drive circuitry for the video display 10 should switch the shutters constituted by spiral rollouts 20 with a cycle time and accuracy sufficient to enable video display 10 to provide a high quality image, preferably a moving video image with a refresh rate of one-thirtieth (1/30) of a second or less. With regard to accuracy, it is important to avoid, or control, cross-talk, whereby one or more pixel shutters undesirably responds to a switching signal intended for an adjacent or nearby pixel. While transistors might be deployed to provide the necessary switching functionality, and might or might not be configurable to avoid cross talk, the invention seeks to provide a display which can be commercially deployed in a wide range of embodiments including very low cost embodiments for which a transistor-controlled drive array would be unduly expensive.

Figure 2:
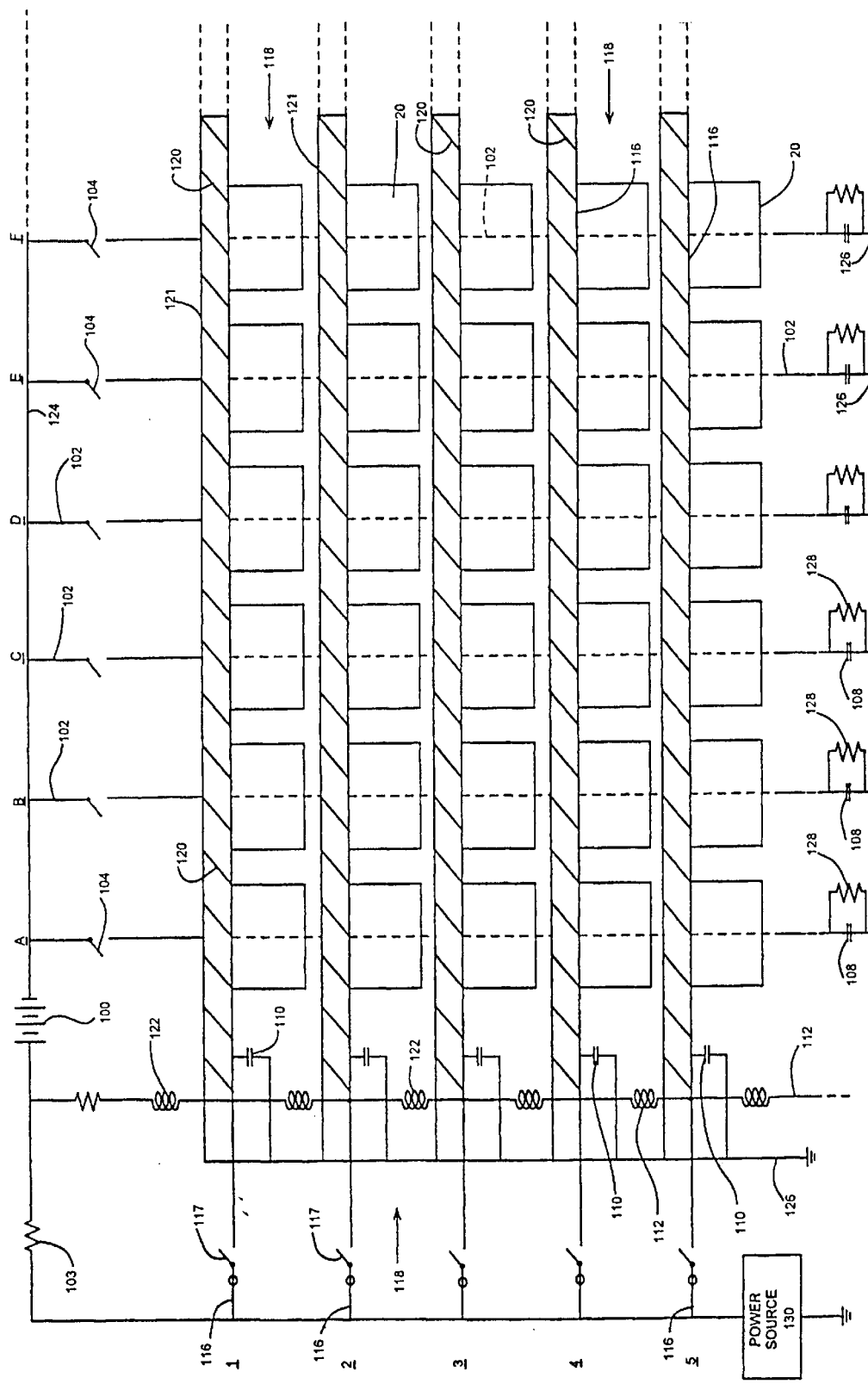
FIG. 2 is a circuit diagram partially illustrating an embodiment of display such as that shown in FIG. 1, having novel drive circuitry employing a dumping capacitor and drain resistor for each row and column of the display raster to control the charging and discharging of specified pixels.

The embodiment of novel drive circuitry illustrated in FIG. 2 provides a high-speed addressable switching system which addresses these objectives by exploiting unique characteristics of the electrostatic pixels employed in the invention which, in most embodiments can receive charge electrically much faster than they move mechanically. For example, square pixels approximately 0.1 inch (about 2.5 mm) wide, may be charged electrically in as little as 5 microseconds, while mechanical uncoiling of the pixel electrode, into a shuttered position where the spiral rollout 20 is extended across the pixel may require about 10 milliseconds, or 2,000 times longer to respond.

The illustrated circuitry uses low cost capacitor and resistor circuit components to provide the necessary control structures. The charge circuitry avoids resistance in the line which would impede rapid charging while the discharge circuitry permits slow pixel charge bleed off through a relatively high resistance determining the duration of the extended, shutter closed, position of electrode 20.

Referring to FIG. 2, the diagram represents a small, but typical, portion of a flat view screen pixel matrix for the video display 10, which, as described above, has a raster of capacitive light valve pixels, each shuttered or switched by a spiral rollout constituted by a spiral rollout 20. Counter or fixed electrodes control the spiral rollouts 20 and for multi-color embodiments, are preferably transparent, being formed of a suitable transparent, conductive coating material, for example, of indium tin oxide, or proton-doped polyaniline, as described above.

The fixed electrodes in control electrode layer 22 are here shown schematically as single-line vertical columns 102, labeled A through E, located to the rear of the pixels, behind transparent dielectric layer 32 (FIG. 1), employing wiring and connections as described above or as will be apparent to those skilled in the art. Columns 102 are powered from a power source 130 by a column feed line 124 and a column clock switch 104 is inserted in each column 102 to close the column circuit and apply power to each pixel in proper sequence, as required as the video signal. Resistance 103 is provided to maintain a potential difference between the rows and columns.

Preferably, a direct current biasing voltage is also supplied, for example as indicated by battery 100 with a valve near to or just below the threshold activation voltage of the pixels. Power source 130 outputs a display drive signal with all necessary characteristics of voltage, pulse, phase, timing, and so on, that are required to actuate the display. Depending upon whether the application is analog or digital, suitable sync circuitry or software drivers are provided to interpret the video signal into appropriate drive signals for a particular embodiment of display, as will be apparent to those skilled in the art.

Suitable voltages will be apparent to those skilled in the art, or can be determined without undue experimentation. Generally, the lowest effective voltage will be preferred for reasons of economy of space and components, as well as safety. At a minimum, the voltage provided by power source 130 must be no less than the pixel activation threshold which depends upon the capacitance characteristics of individual pixels and the mechanical force required to uncoil a prestressed, coiled, spiral rollout 20, minus whatever biasing voltage is provided by battery 100, or other biasing voltage source, if present. The activation threshold will vary with the length of the rollout, i.e. the distance of excursion, and will vary inversely with the dielectric thickness. Substantially higher voltages than the activation threshold can be used, especially for devices connected to a building power supply providing a constant 120 volt or higher source, and will provide quicker roll out of the coiled pixel. The modest power requirements of electrostatic devices facilitate management of such higher voltages as may be desired for particular applications.

The pixels are arranged in rows 118, labeled 1 through 5, of approximately square spiral rollout shutters shown in an unrolled condition (shutter closed). All pixels in a row 118 are connected to be electrically common to each other and to a row-dumping capacitor 110 which is provided at the left-hand end of each row 118 to assist in charging the pixels in each row 118. Columns 102 are similarly each provided with a column dumping capacitor 108 to which each pixel in the column 102 is connected. Capacitors 108 and 110 function as local charge reservoirs, accepting the initial charge rapidly from power source 130, storing the charge, and then dumping or discharging it slowly back to the capacitive pixels, one after the other, over the time period required for the pixel's shutter to roll out. Preferably, the circuit parameters are selected so that each pixel to be activated can draw an initial quick charge from row dumping capacitor 110 to initiate the roll out and a follow-up charge from column dumping capacitor to sustain the spiral rollout in its extended position. In choosing the circuit parameters advantage can be taken of the hysteresis characteristics exhibited by capacitive electromechanical shutter pixels, whereby the voltage required to hold the shutter closed (extended), is significantly less than the voltage required to initiate movement of the shutter.

The drive circuitry shown is an illustrative embodiment of an electrostatic device for charging and discharging capacitive spiral pixels shutters, of capacitance C, through series-connected resistances each of value R, according to a time constant of the resultant RC circuit which in each case is equal in seconds to the resistance value in ohms of the respective resistance, multiplied by the capacitance value in farads (RC time constant) of the respective row dumping capacitor 110, or the column dumping capacitors 108. Row dumping capacitor 110 should have a capacitance adequate to initiate ALL the pixels in a row, if necessary, while column dumping capacitor 108 has a capacity selected to provide at least a sustaining or supplemental pulse for a single pixel. In each case, the time constant should be selected in relation to the display's refresh cycle so as to ensure that any residual charge in the respective capacitor 108 or 110 drains down to a low enough value to avoid inadvertent pixel actuation, or interference with pixel actuation, before the next cycle commences. The drained down residual charge, if any, should be no more than one tenth of the charged value, and is preferably significantly lower.

Capacitors are low cost devices which may be incorporated in film or PC board technology very economically, especially with the low capacitances required to charge even a complete, high resolution row of one thousand or more pixels, and which can for example be ceramic or tantalum chip capacitors or other types of low cost capacitor.

Drain resistors 128 are provided, one to each column 102, and are connected in parallel across a respective column dumping capacitor 108, to leak charge from one side of the column dumping capacitor 108 to the other to drain static build up, and have a value selected to drain down charge from capacitor 108 before commencement of a refresh cycle, as described above.

Drain resistors 128 can take any suitable form but are preferably thin-film distributed bleed resistors fabricated from a readily depositable material for example a quaternary ammonium salt-based material, such as that used to dissipate static charge on cloth material. Resistance of these materials is quite high but their conductivity is adequate to discharge static buildup (e.g. about $10^8$ or $10^9$ ohms/square). Drain resistors 128 can be embodied on a silicon chip by coating the chip with a suitable pattern of such resistive material.

Each pixel row 118 is supplied with power from source 130 by a feed line 116 controlled by a clock switch 117, and its row dumping capacitor 110 is grounded by ground line 126. A bleed coat is put down parallel to the rows, forming bleed resistor lines 120, to provide an impedance between each spiral rollout 20 at feed line 116, and ground, represented by a ground line 121. Bleed line 120 provides a small spatial separation between dumping capacitor 110 and feed line 116, on the one hand, and ground line 121, on the other hand. Bleed resistor line 120 can be formed of any suitable material to have performance characteristics such that the charge in any unfurled pixel in the row drains off with a very small current in approximately 10–30 milliseconds, more preferably about a thirtieth of a second, providing a lag which approximates the lag of the phosphors of a computer or television cathode ray tube, wherein the signal bleeds away in the time required for one frame. Thus, for an unfurled, electrode extended, pixel with a capacitance of, say, 10 pF (picofarad) selecting bleed line 120 to provide a resistance of about 3,300 megohm at each pixel will permit a charge-drain cycle to be complete on each frame of a 30 Hz refresh rate. A resistance of about 1,600 megohm will be appropriate for a 60 HZ refresh rate, and so on. If desired, for the purpose of reducing interference or cross-talk between adjacent pixels, resistor bleed line 120 can be divided by air gaps between adjacent pixels to provide individual pixel bleed resistors.

Typically, there is no negative pulse in the bleed-off of a video pixel as described in the preferred embodiments of the invention, simply an attenuation of the energy in the pixel capacitor over time. Reversal of polarity is not necessary: the voltage is either all negative or all positive.

Bleed line 120 is preferably a thin-film conductor of suitable resistance, for example, vapor deposited aluminum or graphite, or a suitable quaternary ammonium salt, or a suitably resistive material which can be photo-etched into the circuit in a desired location, with precision.

The pixels are based by a battery 100 connected in column feed line 124 and a bias control line 112 which connects with each row feed line 116 to apply a suitable DC bias voltage to each row. The bias voltage lifts the actuating voltage from ground to a point near the threshold voltage of the spiral pixels which makes it possible to use a smaller pulse voltage to actuate a given pixel.

Preferably, a series of RF chokes 122 is provided in bias control line 112, connected between each row feed line 116 to protect bleed line 120, feed line 116 and bias lines 112 from pulses moving between rows. RF chokes 122 can, as known to those skilled in the art, be choke coils or inductances used in a circuit to present a high impedance to frequencies above a specified desired frequency range, so as to inhibit pixel activation pulses from passing, without appreciably limiting the flow of direct current.

Chokes 122 can be formed, for example, from a single strand of soft iron, which is preferably coiled and, optionally, is copper coated for soldering. If necessary, or desired, such a coiled soft iron choke can be combined with a strand of copper to reduce its resistance.

The software drivers receive instructions from computer operating system or application software or from television program signals, or other such image maker, and output suitable command sets for column and row clock switches 104 and 117 to activate appropriate patterns of pixels to provide the desired image. Alternatively, for analog applications the sync circuitry provides the necessary interpretation between the video signal domain and the particular display hardware.

In the relaxed state of the pixel, with no voltage applied, the spiral shutter is retracted and light filters through the pixel. Pulse voltage supplied by the power source 130 applied to the pixel, e.g. for one or a few microseconds, causes the spiral pixel shutter to unfurl and block light from passing through the pixel, closing the shutter. Then the spiral pixel shutter retracts (rolls up) opening the pixel, allowing light through the pixel, until the next pulse is received. During the time period between pulses, energy stored in the corresponding row capacitor 110 leaks out across the bleed resistor line 120.

By varying the pulse duration or width supplied by the power source 130 to column dumping capacitors 108, the spiral pixel shutter can be controlled to allow more or less light to filter through the pixel. If the pulse duration is high, the spiral shutter unrolls, extending across the pixel almost completely and blocking most or all of the light from passing through the pixel. The shutter is closed. If the pulse duration is low, the spiral shutter only extends partially, allowing some light to pass through or alternatively, may extend fully but retract earlier in its cycle. The pulse width may be determined either in the applied drive signal, or by varying the duration of closure or column clock switches 104.

Such controlled partial time or spatial extension of the pixel shutter enables the pixel intensity to be varied to provide tints, tones, half-tones or shades of gray. By giving the control electrodes in layer 22 a triangular or tapered shape of diminishing width in the direction of roll out, variations in amplitude of the applied voltage will also serve to control the extent of roll out and thence the intensity of the pixel. Such features are desirable for full color displays. However, in lower cost displays, especially monochrome displays employing high contrast pixel and background, for example, digital signs and automobile dash displays, a binary.

Each spiral pixel is charged with the intended voltage and discharges energy across a bleed line 120. The charging pulse moves from left to right, like a train, from one spiral pixel to another along the row with a duration such that, at any given moment, a group of contiguous pixels along the row may be receiving charge (provided their addresses have been designated for switching by the software drivers). After a row 118 is charged, the remaining charge travels to the next row below, charging those spiral pixels one at a time, also from left to right, in the same manner as the previous row. The number of pixels in the charging group should be less than the number of pixels in a row, to avoid simultaneously charging row-adjacent pixels with the same, or an immediately neighboring, column address, which may cause cross-talk.

To ensure adequate time differentials, it is much more preferable that the number of pixels in the group, $P_G$ be significantly less than the number of pixels, $P_R$, in a row, e.g. $P_G$ should be no more than ninety, or preferably eighty percent of $P_N$ or substantially less. A minimum value for $P_G$ is two, but more useful values will be substantially higher, such as 10 to 50 up to about fifty or even sixty percent of $P_R$ according to the desired refresh rate and charging circuit parameters, including the relevant pixel parameters such as capacitance and response times. Higher values of $P_G$ are useful to reduce overall cycle times and thus enable increased refresh rates, but may be limited by the capabilities of row-dumping capacitor 110. Perhaps more importantly, higher $P_G$ values reduce the time differential within which the charging pulse returns to a given column address at an adjacent row, and increase the risk of interference with the response of an adjacent pixel, possibly by inducing unintended, or overly prolonged, rollout excursion with consequential blurring or other damage to the image, if such deficiencies are widespread in the image area. Typically, in a high resolution display with, say 600 pixels in a row, the group number $P_G$ will be much less than the row number $P_N$, e.g. $P_G$ may be about 10 to 200 pixels, preferably about 40 to about 100 pixels. In other embodiments, suitable value of $P_G$ will be proportionate to the value of $P_R$.

If there are $P_C$ columns of pixels, the total number of pixels in the raster will be $P_R \times P_C$, and if the display is to be capable of charging every pixel on every refresh cycle, then for a refresh rate R Hz, the maximum pulse width duration $T_{CHARGE}$ of a traveling group pulse comprising $P_G$ pixels that can be applied via column clock switch 104 is given by $$T_{CHARGE} = P_G/(P_R \times P_C \times R).$$

The only pixels in the group that are charged are those designated by the software drivers, according to the video signal's requirement for a closed shutter (rollout 20 extended) at a particular address in the row. While row clock switch 117 for a particular row is closed, the drivers cycle through each column address in turn, sequentially closing the column clock switches 104 of the columns that contain pixel address in that row that are designated for activation. The entire picture is refreshed frequently, for example, 30 times per second. Each row 118 is charged, in turn, until the whole picture forms a predetermined pattern of scanning lines that provide substantially uniform coverage of the raster.

Clock switches 104 time the columns 102 so that each pixel's spiral shutter goes ON and OFF at the appropriate time to assure a coordinated video picture. The columns 102 are connected to column feed line 124 and clock switches 104 are operated to commutate the columns and provide a progressively moving charging pulse traveling across the raster. The sequence and refresh rate of shutter excursions are controlled such that the viewed screen image is a single unified structure.

Row 116 and column drivers are timed to provide a raster of pixels which sequentially open to a controlled extent, by retracting or coiling electrodes 20, to control depth of color on each pixel and mix primary colors to give the appearance of natural color, matching a scene scanned by a camera or depicting motion as in a motion picture. In one example, employing pixel shutters with a maximum excursion of 10 millimeters, a charge pulse with a width of about 5 microseconds is applied to the dumping capacitor 110 and causes the spiral rollout 20 to extend fully in about 10 milliseconds, incomplete excursions for lighter color values being effected in less time. The short charge time of the dumping capacitors allows the circuitry to actuate spirals fast enough to cover the entire raster while each pixel's response time is slow enough to generate a full color picture on the capacitive matrix, which is acceptable to the human eye. The raster is charged at rates of thirty (30) frames per second or at another rate determined by broadcast equipment and settings. To speed up the rate of excursion, voltage can be increased.

In a preferred embodiment of the invention, the RC circuit functions to delay the application of the charging voltage across the appropriate dielectric during a period selected to enable a suitable group of pixels, e.g. 15, to be charged. The selected group is horizontally contiguous but will travel from the end of one row to the beginning of the next. Each spiral pixel can be charged for a suitable period, e.g. 75 microseconds while the next 15 pixels in sequence also receive charge simultaneously from the dumping capacitor before the charge in the dumping capacitor has leaked off to ground.

In one example of a display according to the invention, comparing a raster of pixels about 0.1 inch (2.5 mm) square, having an active area of about 0.001 in$^2$ (about 6 mm$^2$) employing aluminum-coated polyester electrode spirals rolling out onto a 1.5 mil (about 400 micron) thick polypropylene dielectric with indium tin oxide control electrodes, and a small spiral rollout marginal anchor portion of about 1 to about 20 percent 3–10 percent of the area of the pixel, the capacitance can vary between about 0.2 pF (picofarad) in the coiled, retracted state (shutter open) an about 9 pF in the uncoiled extended state (shutter closed). Those skilled in the art will understand that the foregoing (and following) quantities are approximations and that considerable variation are possible within the scope of the invention. Thus, the capacitance of pixels of comparable area will vary according to the thickness and nature of the dielectric, and other factors. For pixels about 0.1 inch (2.5 mm) square, the capacitance may lie in a range of about 0.01 to about 5 pF, preferably about 0.05 to about 1 pF, in the coiled, retracted state and about 0.5 to about 500 pF, preferably about 1 to about 50 pF in the uncoiled, extended state of the electrode 20. Preferably, the proportion of capacitance in the uncoiled to the coiled state is at least 10:1 and more preferably at least 25:1. Proportions of 40:1 or higher are still more desirable, subject to the physical constraints of the geometry of the pixel. Capacitances of different sized pixels can vary accordingly, in proportion to their area.

A suitable value for the capacitance of row dumping capacitor 110, for a row of 1,000 such pixels of 9 pF, electrode extended, would be about 0.01 $\mu$F, being sufficient capacity to charge every pixel in the row, although a value of about 0.015 to about 0.02 $\mu$F, would provide a better reserve margin.

Those skilled in the art will understand, by direct comparison, proportioning or other simple extrapolation from the exemplary values given here, other values that may be used for the circuit components of the invention, according to the electrical parameters of particular pixel arrays, and what balance of performance characteristics may be obtained in a particular embodiment of the invention, for example, as between number of pixels in the display (resolution), pixel size, refresh rate and power utilization and so on. Furthermore, while the circuitry aspects of the invention have been here discussed in the context of solutions to the problem of avoiding cross-talk, it will also be understood that features of the invention that are independently new and useful, for example, resistor-capacitor configurations that are selected to cooperate with the pixel's mechanical and electrical parameters to provide desired visual effects, may be usefully applied in other display circuitry embodiments than those shown herein, or than embody cross-talk resistant features, and will in many cases be useful in providing suitable drive circuitry for any of the embodiments of electrostatic display disclosed in this application, the parent application, or the parent patents, or for other electrostatic displays known in the art.

As explained above, the decay time of a given pixel configuration is readily controlled, within the limits of the mechanical response characteristics of the spiral rollout 20, by selection of the value of bleed resistance line 120. Since smaller pixels have quicker response times, the invention contemplates as feasible mega-pixel displays with refresh rates of 100 or even 200 Hz, which would be suitable for high-definition television (HDTV), employing pixels of width in the range of about 0.01 to 0.04 in. (or about 0.02 to 0.1 cm).

Figure 2A:
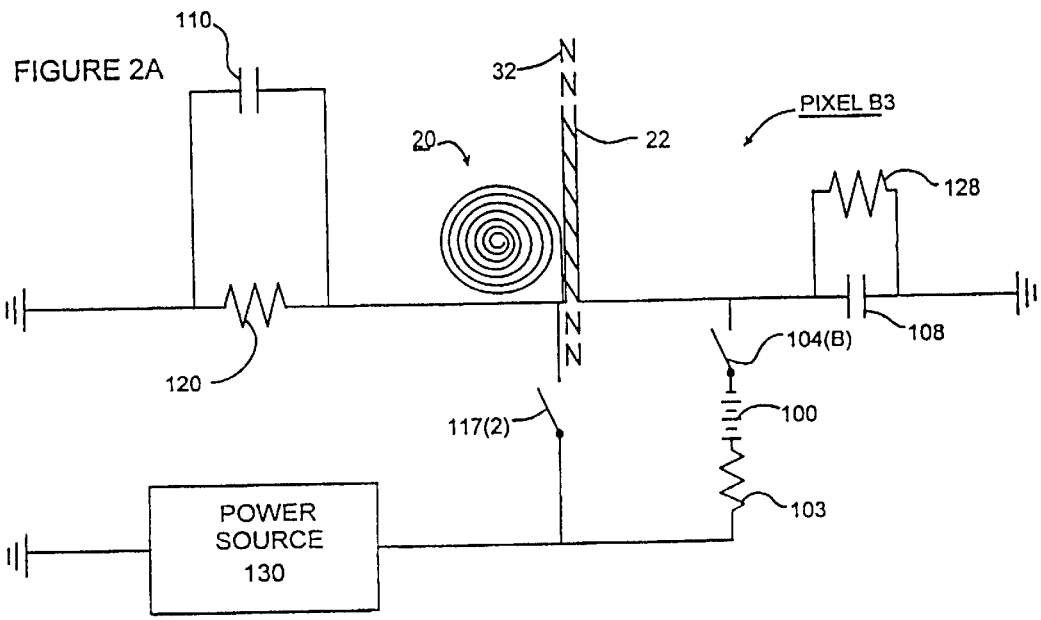
FIG. 2A is a schematic circuit diagram of a portion of the embodiment of FIG. 2, showing charging and discharging circuitry connected with a single pixel.

The charge and discharge circuitry controlling an individual pixel can be better understood by referring to FIG. 2A, which shows the circuitry associated with a single pixel, in this case, pixel B3. In FIG. 2A, it may be seen that the pixel's spiral rollout 20 (at its metallized surface) is series connected through clock switch 117 with power supply 130 while its respective control, in layer 22, is series connected through clock switch 104 with battery 100 and power source 130. Row dumping capacitor 110 is parallel-connected with the pixel via rollout 20 and ground, while column dumping capacitor is similarly parallel-connected with the pixel via ground and its fixed electrode. Bleed resistance 120, across row dumping capacitor 110, and drain resistance 128, across column dumping capacitor 108, complete the circuit elements for an individual pixel.

Figure 2B:
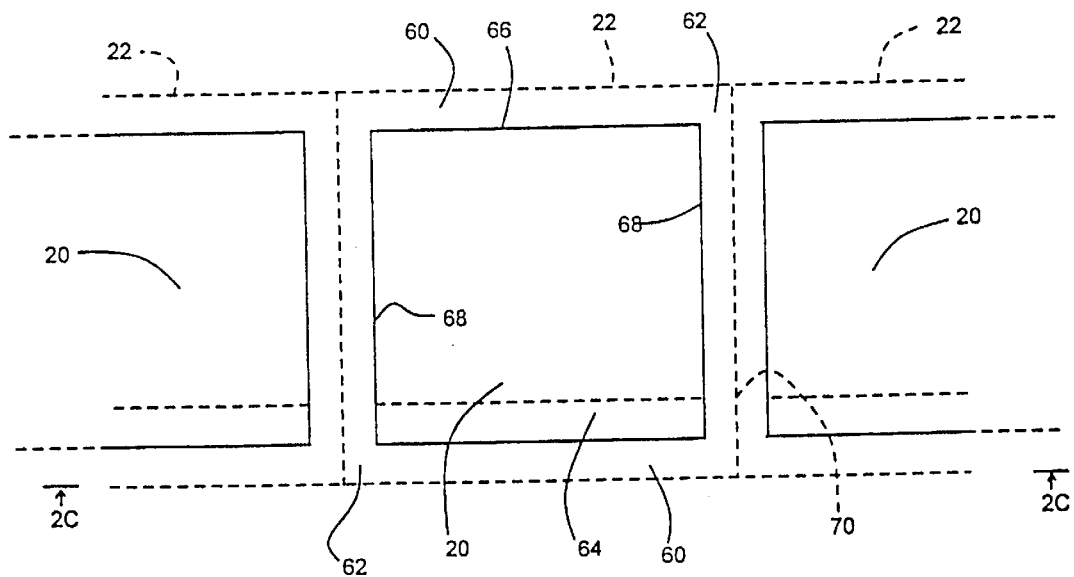
FIG. 2B is a schematic plan view of a portion of a modified display construction showing a pixel rollout provided with a Faraday cage.
Figure 2C:
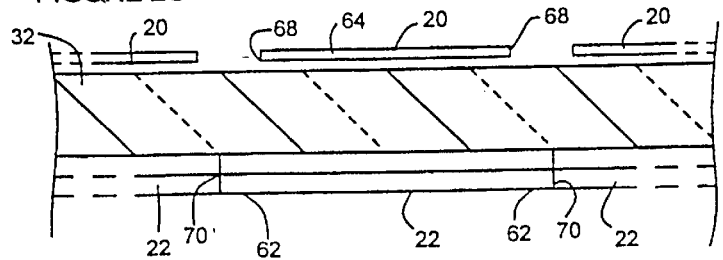
FIG. 2C is a view on the line 2C—2C of FIG. 2B.

In the modified embodiment shown in FIG. 2B, each individual pixel comprises a Faraday cage extending around the zone occupied by the pixel's spiral rollout 20 to shield the movable electrode and reduce cross-talk or cross-coupling between adjacent pixels, which may adversely affect the quality of the displayed image. Thus, FIG. 2B shows a portion of a row of pixels constructed so that, in each case, fixed electrode 22 is a little larger than the spiral rollout 20, which is here shown in an extended position.

As shown, fixed electrode 22 is larger than rollout 20 and has a marginal zone around is periphery which extend laterally beyond the area of spiral rollout 20 with horizontal extensions 60 running between the rows and vertical extensions 62 running between the columns, so that all four sides of rectangular rollout 20 are shielded. Other configurations of rollout can be shielded by correspondingly shaped and dimensioned fixed electrodes 22 providing extended marginal zones along one or more sides or extension of the rollouts excursion area, as will be apparent to those skilled in the art. The peripheral marginal zone constituted by extensions 60 and 62 of fixed electrode 22 provides a Faraday cage around the zone occupiable by rollout 20, shielding the rollout and preventing leakage of charge from the pixel.

The particular configuration of the electrode areas and the width of extensions 60 and 62 can be varied to obtain the desired result of controlling cross-talk between pixels, as may be determined with suitable but not undue experimentation. For example, noting that the anchor end 64 and free end 66 of rollout 20 have different mechanical characteristics from the side edges 68 of the rollout, which will provide different electrostatic characteristics, it may be desirable to vary the width of horizontal extensions 60, in relation to the width of vertical extensions 62, for example by making them larger if cross-talk is a problem. While the invention is not bound by any particular theory, it is believed that any fringing which may occur at the edges of the electrodes will emanate largely from the smaller, movable electrode or spiral rollout 20 to the fixed electrode 22, and will largely be contained by the fixed electrode 20's peripheral shielding zone.

In practice, it is believed that in many constructions cross-talk with a neighboring pixel in an adjacent row may only be a problem as between an extended, unfurled rollout and a coiled, retracted rollout 20 adjacent the unfurled rollout's free end. When two pixels in adjacent rows are in the relaxed, rolled-up state, or when one rollout is uncoiled in a direction away from the other coiled rollout, then the movable electrodes of each pixel will be separated by a sizable air gap which should provide effective charge isolation. Charge leakage between two adjacent extended rollouts, which are therefore both charged, is it not likely to cause any difficulties, should such leakage occur. If desired, cross-talk from a rollout unfurling toward a retracted rollout can be inhibited by electronically terminating the excursion of the unfurling rollout short of its full extent, for example 10 percent short of its full extent whereby the underlying fixed electrode 20 is enabled to provide effective shielding. Such a minor adjustment will usually have little visual impact and, if it does, may even be beneficial in softening the edges of image areas. With these considerations in mind, it will be understood that horizontal extensions 60 may in some cases have little or no lateral extent.

Similarly, the width of vertical extensions 62 of a fixed electrode 20 can be selected to provide effective shielding of the rollout 20 to inhibit transfer of charge from an activated pixel to a neighboring inactive pixel in the same a row.

Fixed electrodes 22 are laterally defined and separated by separator means 70 which can comprise an air gap, an insulator or member of relatively poor conductivity. In one embodiment, pursuant to the teaching of one or more of the parent applications, fixed electrode 22 comprises a transparent film of indium tin oxide deposited on either dielectric layer 32 or a supportive substrate, and adjacent fixed electrodes 22 are separated by air gaps. An alternative an air gap is a an insulator member, for example a polymer filament, which could by way of further example be provided as a mesh-like film inserted against the dielectric layer 32 or between dielectric layer 32 and a substrate, with a suitable electrode material being deposited, or otherwise formed into the openings in the polymer mesh.

If desired, the gaps between rollouts 20 that are implied by horizontal and vertical extensions 60 and 62 can be visually masked with for example, white or black lines, in any desired layer of the display between the rollout layer and the viewer. Some larger constructions of display may permit an insulating or poorly conductive separator element (not shown) to be laterally interposed between adjacent rollouts to provide desired masking, and to enhance control of cross talk.

An alternative way (not shown) of effectively providing a Faraday cage around a pixel or along desired edges of a pixel, is to render non-conductive an appropriate small peripheral marginal portion of the conductive surface of rollout 20 that faces dielectric layer 32 (in the case of metallized polyester, the metallized surface), either by removing the conductive material, or not applying it to such a small peripheral portion, or by coating it with a suitable insulator. This approach can reduce the optical spacing between adjacent pixels, but may entail manufacturing complications.

It will be understood that in cases where such pixel shielding measures are sufficiently effective, the traveling pulse technique of charging the raster of pixels may not be necessary to avoid cross-talk or cross-coupling. Thus the invention contemplates use of either a traveling pulse or pixel shielding or a combination of both innovations, to avoid cross-talk and provide satisfactory image quality, the particular method being selected according to the characteristics of a particular embodiment of display, which can be determined by experiment, if necessary.

Turning now to the behavior of an individual pixel and referring again to FIG. 2A, in the quiescent state of pixel B3 spiral rollout 20 is coiled up into its retracted position, permitting light to pass through the pixel without interruption or modulation. The pixel is light transmissive. At the beginning of a row charging cycle, when the raster scan reaches any given row, row clock switch 117 closes, charging row dumping capacitor 117 and raising the potential of each spiral rollout 20 to the value of the applied signal. Switch 117 remains closed while a traveling group pulse moves sequentially along the row from column to column with a duration at each column such that, ignoring end effects, from about 10 to about 50 columns are being pulsed or charged at any given moment in the charge cycle. Only those clock switches 104 of those columns having a pixel address in the given row designated for activation by the video signal are closed. The timing and duration of closure of each clock switch 104 is selected to provide the desired traveling group pulse. When the last column in the raster has been addressed and pulsed, if designated, switch 117 in row 2 is opened preparatory to closing the next row switch and repeating the charging cycle for the next row (row 3, for instance).

When the traveling group pulse reaches column B, clock switch 104 in column B closes, until for example nineteen pixels (or thirty-nine or whatever the group number is, minus one) to the right of column B (columns C through T, say) receive the pulse, whereupon clock switch 104 in column B returns to the open position. Closure of clock switch 104 in column B applies the bias voltage from battery 100 to the pixels' fixed electrode in layer 22 and to column dumping capacitor 108. The combined charges of column dumping capacitor 110, at a potential determined by power source 130 and of row dumping capacitor 108, at a potential determined by battery 108, now act on pixel B3 and are effective to begin unfurling spiral rollout 20. Neither capacitor 110 nor capacitor 108, taken alone, is sufficient to initiate movement of rollout 20, preventing unintended activation of non-designated pixels. Long before there is significant rollout excursion, the traveling pulse has moved on and column clock switch 104 has opened. Preferably, component parameters are selected to ensure that column dumping capacitor 108 is adequately drained before the traveling charging pulse returns to column B in the next row when column dumping capacitor 108 will receive a further pulse if pixel 3B is designated for activation.

As rollout 20 extends, the capacitance of the pixel increases and the rollout draws charge from row dumping capacitor 110 to complete its excursion, provided that the pulse delivered to column capacitor 108 was sufficient to hold the rollout fully extended. If a short or narrow pulse was delivered, partial extension results. Pixel B3 is now partially or fully reflective.

The rollout remains extended until charge has drained from row dumping capacitor 110 and from the pixel itself to an extent such as to drop the potential difference across the pixel below its OFF threshold, whereupon the spiral rollout rapidly retracts to its coiled, relaxed condition into which it was pre-stressed during manufacture. Pixel B3 is again light transmissive.

The capacitor charging times are very short, being preferably measured in microseconds, compared with the mechanical response times of the pixel which may be measured in milliseconds. A refresh rate of 30 Hz, a current video standard, provides a time slice of about one-thirtieth of a second within which to complete a charging cycle across the raster. When the performance of an individual pixel is considered, the electrical response times are negligible compared with the mechanical. However, the electrical characteristics should be tuned to enable a full raster scan to be completed on every cycle. For a pixel of the order of 0.1 in (2.5 mm) long a pixel excursion time in the range of about 1 to 10 milliseconds can be obtained, occupying a relatively small proportion of the available time slice. (The excursion time for a rectangular spiral rollout 20 can be expected to be largely independent of its width.) A few milliseconds, e.g. 2–5, can be allowed for retraction of the rollout, with the electrical parameters being adjusted, pursuant to the teachings herein, to provide sufficient charge to hold the rollout 20 extended for the to balance of the time slice, about 20 ms, or a little less. Alternatively, if desired, the hold-down phase may be extended substantially to the end of the time slice, permitting retraction, if designated in the next refresh cycle, to occur at the beginning of the next cycle. Such phase overlap can improve image persistence and reduce rollout cycling, preventing oscillation of the spiral rollout 20 of a pixel designated for activation in multiple consecutive cycles. Most video images have only small changes between most frames.

Some possible specifications of displays of various sizes and resolutions are set forth in Table 1 below:

bonds the metallized spiral to the base dielectric and substrate while completing an electrically conductive path to the aluminum from the, fixed electrode side of the dielectric.

A further desirable characteristic of a preferred drive circuitry system for a high-speed electrostatic pixel display matrix, whether it be a matrix as described herein or as otherwise known in the art, for example from Bozler U.S. Pat. No. 5,233,459, is that it be easily and inexpensively reproduced.

TABLE 1

Examples of Display Specifications

| | | Ex.. 1 | Ex.. 2 | Ex.. 3 | Ex.. 4 | Ex.. 5 | Ex.. 6 |
|---|---|---|---|---|---|---|---|
| Typical Application | | Appliance, cell phone | Classroom, lecture hall | Notebook computer | HDTV | Traffic sign | Sports arena |
| Resolution ($P_C \times P_H$) | | 20 × 60 | 480 × 640 | 768 × 1068 | 1000 × 1500 | 96 × 192 | 600 × 800 |
| No. of pixels in display | | 1200 | 307,200 | 820,224 | 1,500,000 | 18,432 | 480,000 |
| Sq. Pixel Dimension | in | 0.05 | 0.1 | 0.01 | 0.02 | 0.5 | 0.3 |
| | mm | 1.25 | 2.5 | 0.025 | 0.5 | 12.5 | 8 |
| Overall Dimensions | in | 1 × 3 | 48 × 64 | 7.7 × 10.7 | 20 × 30 | 48 × 96 | 180 × 240 |
| | cm | 2.5 × 7.5 | 120 × 160 | 19.2 × 21.4 | 50 × 75 | 120 × 240 | 450 × 600 |
| R Refresh rate | Hz | 30 | 30 | 60 | 60 | 30 | 30 |
| $P_G$ Pixel Charging Group | | 10 | 100 | 100 | 450 | 10 | 200 |
| Maximum Column Charge Duration | $\mu s$ | 278 | 11 | 2 | 5 | 19 | 14 |

The proportions of rectangular pixels can be adjusted to optimize the electromechanical behavior of the matrix. If desired, the pixels, and their spiral rollouts can be designed to have smaller than unitary length-to-width ratios so that, for example, if a spiral pixels roll out half the equivalent length for a square pixel, the added capacitance would be large and helpful in adding initial capacitance to sustain roll out.

In a modified embodiment, the dielectric can be loaded with a material having a high dielectric constant to increase the effect of the dumping capacitor. As the dielectric constant of a normal dielectric is relatively low, significant capacitance is added to the dumping capacitor in parallel with the indicating capacitor. Conversely, to decrease the effect of the dumping capacitor, the length of the roll out is increased with respect to the width of the roll out.

Use of a conductor-loaded adhesive (or suitably conductive polymeric adhesive) to anchor the spiral rollouts 20 to the dielectric base and provide a conductive path through the polymer to the polymer's metal coating provides another means of managing the RC constant between the spiral pixel and the indium tin oxide counter electrode to have a desired value, by suitable choice of conductor material and its loading in the adhesive to provide a desired conductivity (or resistivity) in the conductive path through the polymer.

Film of metallized polymer such as polyethylene naphthalate ("PEN" an alternative to the metallized MYLAR, trademark DuPont, polyester film disclosed in the parent patents), coated with aluminum on one side, with the metal side down and the plastic side up can be used for the spiral rollouts. A laser can be used to puncture a line of holes about one millimeter in diameter spaced approximately four millimeters apart along the top row of pixels. When suitably filled, the laser holes create an electronically conductive path and provide an anchor between the plastic side of the row and the dielectric plastic layer. An adhesive material (for example silicone) is filled, for example with ball-milled graphite to render the adhesive conductive, and is then applied in a straight line across the anchor portions of each spiral rollout 20 in a row, filling the laser holes. The adhesive To this end, the drive circuitry system can be componentized, sourcing known subsystems as existing assemblies, especially as integrated circuits, or printed circuit boards, from component vendors, where possible. For example, suitable row and column driver inputs are available in integrated circuits comprising groups of fast-terminals and switches connectable with pixel rows or ITO columns, respectively, from vendors such as Supertex, Inc. Sunnyvale, Calif.

The embodiments of display illustrated in FIGS. 3 and 4 provide examples of low-cost monochrome displays according to the invention which could, alternatively, if desired, be rendered as full-color displays, at a higher cost, by incorporation of a suitable mosaicked color screen 24.

Referring to FIG. 3, the display construction shown is suitable to provide a rugged, portable, bendable, low-cost, light-weight, shock-proof and vibration-proof reflective device particularly suited to field use, e.g for military, environmental and expedition use, or for portable video games or game players, and so on.

The layers shown comprise a thin-panel back plate 150 formed essentially of aluminum, optionally strengthened with a backing layer of plastic reinforcement 152 to strengthen protect aluminum back plate 150 inexpensively. The aluminum back plate 150 is both electrically conductive, providing part of a Faraday cage to protect the display from static fields, and optically reflective reflecting light entering through cover 52, to illuminate the raster. Electrically conductive vertical columns 154 of fixed or control electrodes can be inexpensively provided (current cost about one penny per square foot) employing a suitably patterned film of a metallized polyester bonded to the aluminum back plate 150, with the insulating side to the back plate preventing columns 154 from shorting out through the aluminum back plate 150. Though various other constructions are possible, such as die-cutting electrode patterns through the full thickness of the metallized polyester film, it is preferred that the electrode pattern be applied only to the metallization, for example by photolithographic etching.

The layer of columns 154 can be heat-bonded to a polypropylene or other transparent dielectric layer 156, the bonding being effected in the etched areas between electrodes where metallization has been removed.

Rollout anchor lines and spiral rollouts 20 are bonded to the front surface of the dielectric 32 with adhesive as described herein or in the parent patents. An adequate gap 156 is maintained between the spiral rollouts 20 and a protective front window, or clear cover 52. For smaller devices, a gap 156 of 3/32 in may be adequate to provide clearance for rollouts 20. But as the area of the display screen gets larger, it becomes desirable to use a thicker, more rigid window, to support itself. With such larger devices, as the screen glass gets thicker and heavier and less flexible, its weight and rigidity may become drawbacks. The use of PLEXIGLASS or LUCITE (trademarks) clear plastics polymer equivalents provides a window which is significantly clearer and lighter than window glass (though less scratch-resistant) and may be suitable. Glass is useful where high temperatures are necessary in manufacture or to provide a scratch-resistant outer layer.

Referring to FIG. 4, the layered construction shown is suitable for a heavier, more expensive electrostatic display device which may require supplemental protection from shock and vibration, when deployed in portable devices, but may otherwise be well suited to more protected environments such as desktops or wall-mounted displays, with little further protection beyond a conventional housing. The structure illustrated permits either transmissive or reflective viewing of the display, according to the intensity of the ambient lighting, a display capability which can be called "transflective".

This embodiment of display is back-lighted with flat illumination 158 which may be a lamp or lamps or other distributed beam light output device which provides a satisfactory source of background light for the display. The display comprises a pearled glass substrate 162 on the viewer side of which are patterned columns 162 of transparent fixed electrodes, and the device is completed in a similar manner to the FIG. 3 device, with a layer of transparent dielectric 32, rows of spiral rollouts 20, gap 156 and a transparent cover 52. An anti-glare film can be applied to both sides in the window if desired. The columns 162 of transparent electrodes are in intimate contact with dielectric 32 which can be is either polypropylene, TEFLON (trademark) or other suitable transparent dielectric. Columns 162 are vertical relative to the video signal scan and are attached to suitable drive circuitry, such as that disclosed herein, at their ends. On the viewer side of dielectric 32, the rows of spiral rollouts 20 are mechanically and electrically attached to dielectric 32. Each spiral rollout 20 serves as a shutter which progressively covers or uncovers a pixel area on the raster. The pixels are separated from the front window glass or LUCITE 52 by a space of about 3/32 inches or more, depending on dimensions.

Light from illumination 158 travels through the glass substrate 160, columns 162 of fixed electrodes, dielectric 32 and through any open, (shutter retracted) pixel, presenting a white or light appearance to the viewer which will contrast with the black or other low intensity appearance of any extended spiral rollouts 20. Ambient light, enters in the direction of view and is reflected off glass substrate 160, presenting a white appearance, if ambient light levels are strong enough.

Illumination 158 may be user activated, or always on when the display is powered, or, especially for portable applications where power management is at a premium, illumination 158 may be controlled by a light sensor (not shown) to be activated at lower light levels.

Shaped and Flexible Embodiments

Figure 5:
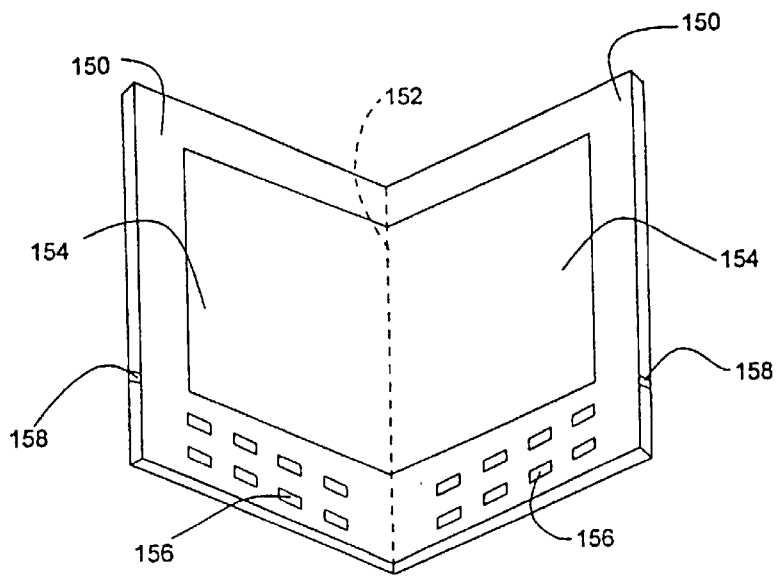
FIG. 5 is a schematic perspective view of a vee-shaped display embodiment of the invention.
Figure 6:
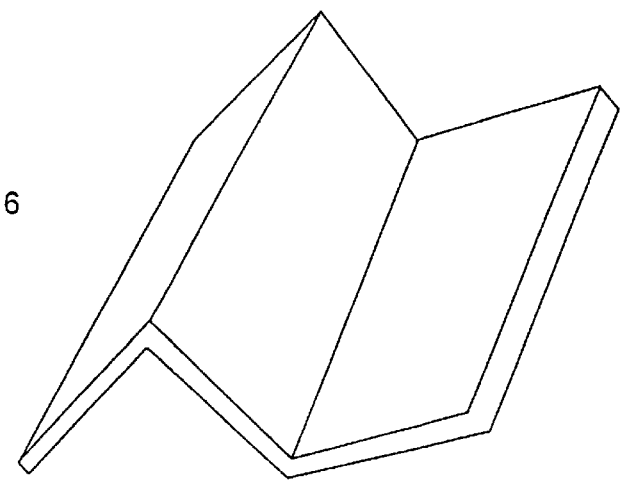
FIG. 6 is a schematic perspective view of a fanfold display embodiment of the invention.
Figure 7:
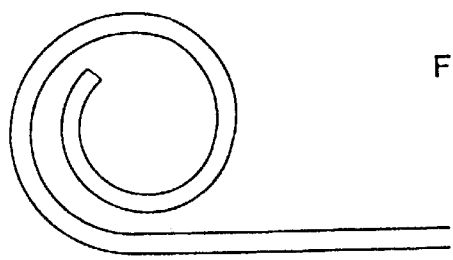
FIG. 7 is a schematic end view of a scroll-like display embodiment of the invention in a partially coiled configuration.

A particular advantage of the novel thin-panel video display technology described herein, and in the parent patents and application, is that the capacitive pixels do not have to be constrained to planar configurations but can be deployed in a variety of shaped displays. More particularly, because the functional components of the pixel elements can be embodied in polymer film materials, suitably shaped and treated polyester, polypropylene and the like, novel flexible, folded and shaped displays can be provided in forms such as books, fanfolds, scrolls and panoramas, such as shown in FIGS. 5, 6, 7 and 8, respectively. Variable form devices such as those of FIGS. 5–7, are compact for storage but can open up to a display area which is larger than any projected area or footprint the device may have during in storage. Thus, for example, a generally rectangular, pocket-book sized, bi-fold device may have overall dimensions of approximately 8 inches by 4 inches (approximately 20 cm by 10 cm), while folded, and open up to provide a rectangular display having a diagonal dimension of 9 or more inches (approximately 22.5 cm) extending across both leaves of the bifold, for example approximately 8 inches by 5 inches (approximately 20 cm by 12.5 cm).

The device shown in FIG. 5, which could for example be a pocket or notebook computer, comprises two halves or leaves 150 interconnected by a hinge 152 which in this case is continuous film flexible material integral with the leaves 150, unlike a conventional notebook computer which employs a discrete mechanical hinge. The device has a display area 154 which extends continuously across the hinge from one leaf 150 to the other (also unlike a conventional notebook computer wherein the screen is usually incorporated in one half while the keypad is incorporated in the other leaf). Display area 154 can be significantly larger in area than the area of either leaf alone which is the footprint or form factor of the device when the leaves 150 are closed together for storage or transport. As shown, the device has a control area 156 comprising keypad, pointing device or other user I/O devices which also extends across both leaves 150. If desired, each leaf of the device could have a further hinge perpendicular to hinge 152 located outside display area 154, for example at 158, and a display prop or other support (not shown) at the back of the device, whereby the leaves 150 can be opened flat upon a support surface and the display area can then be raised about a hinge line between locations 158 and propped in a customary upright position, for example, at an angle of perhaps 120° to the surface and control area 156.

The FIG. 6 three-panel fanfold and FIG. 7 two-circumference scroll exemplify other useful compact configurations of flexible display that are advantageous for storage and portability. Other such configurations will occur to those skilled in the art.

Figure 8:
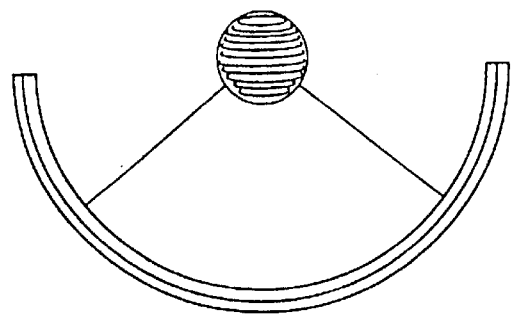
FIG. 8 is a schematic plan view of a two-dimensionally curved, wrap-around display embodiment of the invention.

FIG. 8 depicts a concavely curved, shaped panoramic display having a part-cylindrical configuration curved about a center at a convenient viewing distance, e.g. two to four feet for an individual viewer, four or more feet for groups, with possible outdoor or indoor novel theatrical experiences provided by large scale such screens, possibly constructed in panels, having a radius of 50 or one hundred feet or more (16 or 33 or more meters). Other useful curved configurations of display will occur to those skilled in the art as being contemplated by the present invention. Depending upon the materials employed, the curvature need not be limited to simple, or circular curvature in two dimensions, but can adopt that of parabolic, ellipsoidal, or more complex arcs and may be three dimensional, for example, a novel display contrasting with conventional convexly curved cathode ray tube displays may have a concave spherical curvature centered at a preferred viewing distance so that all points of the display are equidistant from an optical receptor, e.g. the eye, placed at the center of curvature.

The housing structure may also be flexible or shaped according to the configuration of the display, or may have a fixed, box-like shape to accommodate a folded or rolled up display in an out of use configuration. Other flexible, foldable or shaped, or shaped and flexible, thin-panel display structures, employing flexible film materials, but using different pixel technology will be apparent to those skilled in the art. For example, a portable video presentation device, e.g. a computer, may comprise a notebook style, hinged two-leaf construction device, one leaf of which has multiple panels, e.g. four or six panels, that can be unfolded to provide an extended display area for presentations and can be folded into a compact volume, e.g. with the form of a single panel, for portability.

Seams, hinges, or other high stress or highly curved structure within the display area may or may not include operative pixels, for example a small number of columns of pixels in a vertical fold application may be by-passed by conductors or their addresses may be interpreted as non-existent by software drivers, or the display may be a composite display of physically separated panels of pixels, the panels cooperating to provide the desired image and functioning together as an integral display. If desired to facilitate construction, small margins between the panels may be passive, non-pixellated structures.

As a further protection against electrostatic interference, the electrostatic displays of the invention, or prior art electrostatic displays, can be housed in a Faraday cage by rendering conductive any non-metallic enclosing surfaces around the display, by using conductive plastics material for relevant opaque housing elements that surround or enclose the active display raster, or by coating or impregnating them with conductive material. Those skilled in the art can of course consider such transparent conductive materials, and any other transparent conductive materials, as they are known or become known from time to time, for use in the practice of the present invention, or the inventions of the parent patents, as alternatives to indium tin oxide where a transparent fixed electrode, or other transparent conductive structure, is desired.

Manufacturing Methods

As stated hereinabove, and in U.S. Pat. No. 5,519,565, the inventive displays disclosed herein and in the parent application and patents, are adapted to low-cost mass production methods. In particular, continuous film techniques may be used to provide matrix layer 18 of movable electrodes 20 assembled with dielectric layer 32 and, optionally, with a flexible substrate.

Figure 9:
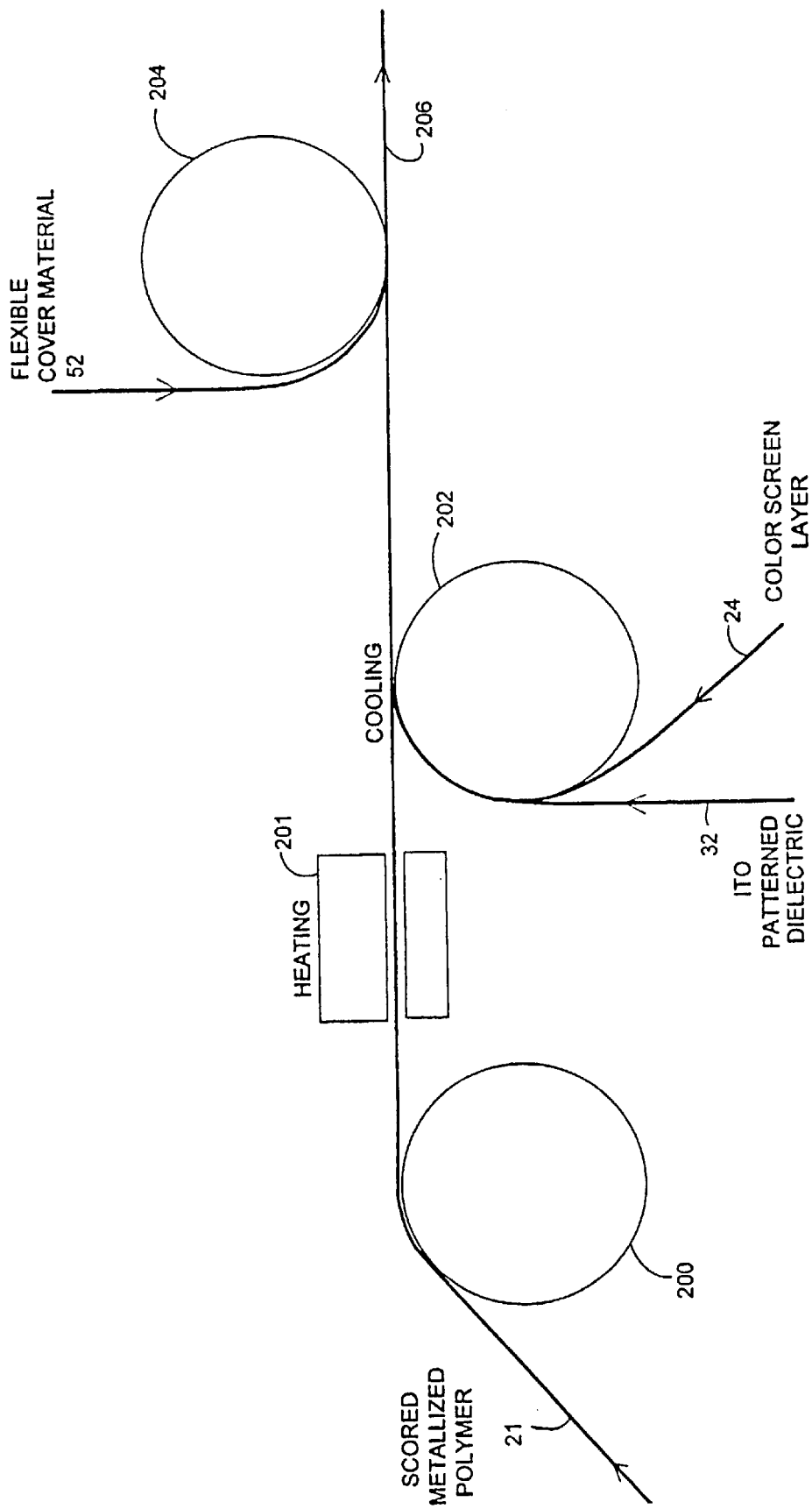
FIG. 9 is a schematic view of an embodiment of the invention relating to the manufacture of a composite continuous film flexible video display product.

Referring to FIG. 9, in manufacturing such a thin-film multi-layer video display product, such as the shaped or flat-panel displays described herein, continuous film materials can be assembled together to provide a multi-layer display matrix product that can be cut and assembled with drive and control circuitry, power supply and suitable housing structure to provide the display itself.

Thus, for example, scored, metallized polymer film 21, e.g. PEN or MYLAR (trademark, DuPont) can be drawn over a tentering roller 200 to stress the film and then through an oven 201 where the pre-scored spirals curl up to provide a layer of spiral rollouts 20 which is then cooled. The cooled film is drawn over a second roller 202 where it is bonded to a film of ITO-patterned polypropylene dielectric 32 and combined with flexible color screen layer 24. The combined layers are then drawn over roller 204 where they are bonded with a flexible, transparent cover material 152 to produce a flexible, multi-layer video display product 206 which can be cut and assembled with a backing sheet, drive circuitry and housing members into displays having a variety of shapes or configurations. With this example of the versatility of the electrostatic pixel technology described herein, and of its realization in flexible construction materials, those skilled in the art will be able to devise other methods of manufacturing similar or equivalent displays.

If a flexible substrate is used then control electrode layer 22 should be fabricated on or with dielectric layer 32 prior to assembly with the substrate layer. In this case, control electrode layer 22 can be printed as a pattern, for example using a roller. Alternatively, a continuous film of suitable conductive, and if necessary transparent, material can be applied to the dielectric or the substrate and laser etched or otherwise patterned to provide a suitable array of control electrodes.

If a metallized polymer is employed as the stock for matrix layer 18, the spiral rollouts can be formed after such assembly by scoring a suitable pattern, e.g. by laser etching, and by heating the scored film in an oven, or equivalent, to tenter the scored patterns, causing them to coil up into spiral rollouts upon cooling. Desired electrical components that should be physically located within the boundaries of the display area, such as feed line 116 and bleed line 120 and RF chokes 122, along with column and row edge connectors and associated conductors, can be added by photolithographic techniques. Column and row components, such as clock switches 104 and 117, row and column dumping capacitors 110 and 108, as well as drain resistances 128, are preferably manufactured as integrated separable components, configured with their own connectors, that can mate with the display's edge connectors.

Further Display Embodiments

The economy and slim profile of the display systems described herein, and in the parent applications, permit a variety of new and advantageous configurations of displays. Some examples of such novel displays will be described below, and others will be apparent to those of ordinary skill in the art.

In addition to conventional size television or computer monitors having a diagonal dimension in the range of from about 6 to about 25 inches (about 15 to about 63 cm), relatively large wall-mounted displays for theater or group viewing provide a particularly advantageous configuration. Such displays can have a diagonal dimension in the range of from about 30 to about 180 inches (about 75 to about 450 cm) although even larger displays may be constructed for special purposes such as outdoor events, concerts and the like. However, a preferred size is in the range of from about 50 to about 100 inches (about 125 to about 250 cm).

Such larger thin-panel display systems according to the invention are lightweight and can readily be wall-mounted, or depend downwardly from a support, or both, with minimal need for any but the simplest support structures such as one or more latches or hooks, or equivalent mechanical structure or even hook-and-loop type fastening means distributed over the rear surface of the display system and complementary wall area. Alternatively, the displays could be built-in. Regardless of the mounting means, such larger configurations of the inventive displays are suitable for use in the home, in the office, for military use or for entertainment of educational use, or wherever there is a need for a large screen displaying a large image.

In such larger configuration, the inventive display provides the advantages of good angular viewability, excellent contrast, bright colors, daylight visibility and, in particular, direct viewing, meaning that the image is created on or at the display itself, not elsewhere. The display accordingly lacks the drawbacks of projected images which require a darkened room and are subject to interruption by individuals moving between the projector and the screen, as is the case, for example, in conventional movie theaters. Thus, a still further application of the invention is to replace conventional movie screens with an electrostatic pixel display screen, pursuant to the invention, providing a new theater experience employing the sharpness and quality of digitized image and optimally offering audience participation interactive features, such a as described below.

Figure 10:
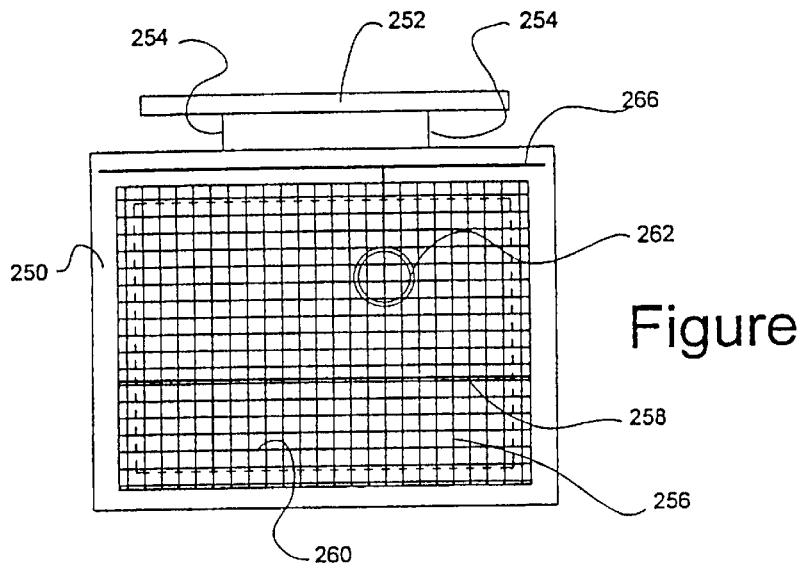
FIG. 10 is a schematic elevation view of a wall-mounted classroom-use display embodiment of the invention.

The display system 250 shown schematically in FIG. 10, is an example of such a larger display embodiment of the invention and is suitable for use in classrooms, lecture theaters, or other educational environments or in conference rooms, where it can be mounted to a wall, pursuant to optional features of the invention, for example by means of an overhead support rail 252 secured to a wall, from which the display 250 is suspended by vertical struts 254. Alternatively, suitable wall mount structure (not shown) may be provided on the back of the display.

The functionality of the display can, if desired, be enhanced by provision of peripheral equipment such as a grid, mask or other viewing attachment, or overlay, for the displayed image, enabling different components and spacing of the displayed image to be relatively scaled, proportioned or dimensioned for the viewing audience. FIG. 10 shows a view graph 256 providing an orthogonal grid mask with labeled axes (labeling not shown) through which screen images can be quantified and referenced, enabling an instructor to direct an audience's attention to precise portions of the image. If desired, suitable scales can be provided on vertically and horizontally movable rulers 258 and 260, respectively.

Other image-enhancing equipment which can be provided, if desired, includes magnification equipment, the magnification power of which should be subject to the resolution of the display, for magnifying a portion of the image or possibly the complete displayed image, color filters to add or remove selected colors from the image, as desired, and other image-modulation filters, as will be apparent to those skilled in the art. One such magnifier 262 which is vertically movable on a support 264 and horizontally slidable on an overhead track 266 so as to be able to access any point of the display image.

Such image-enhancement devices, external or peripheral to the display system itself, are of particular value when used in conjunction with the larger display systems of the invention for professional purposes such as medical imaging where quantification of image features can be of significant value in interpretation of the displayed image, for example to quantify the growth of a tumor.

Figure 11:
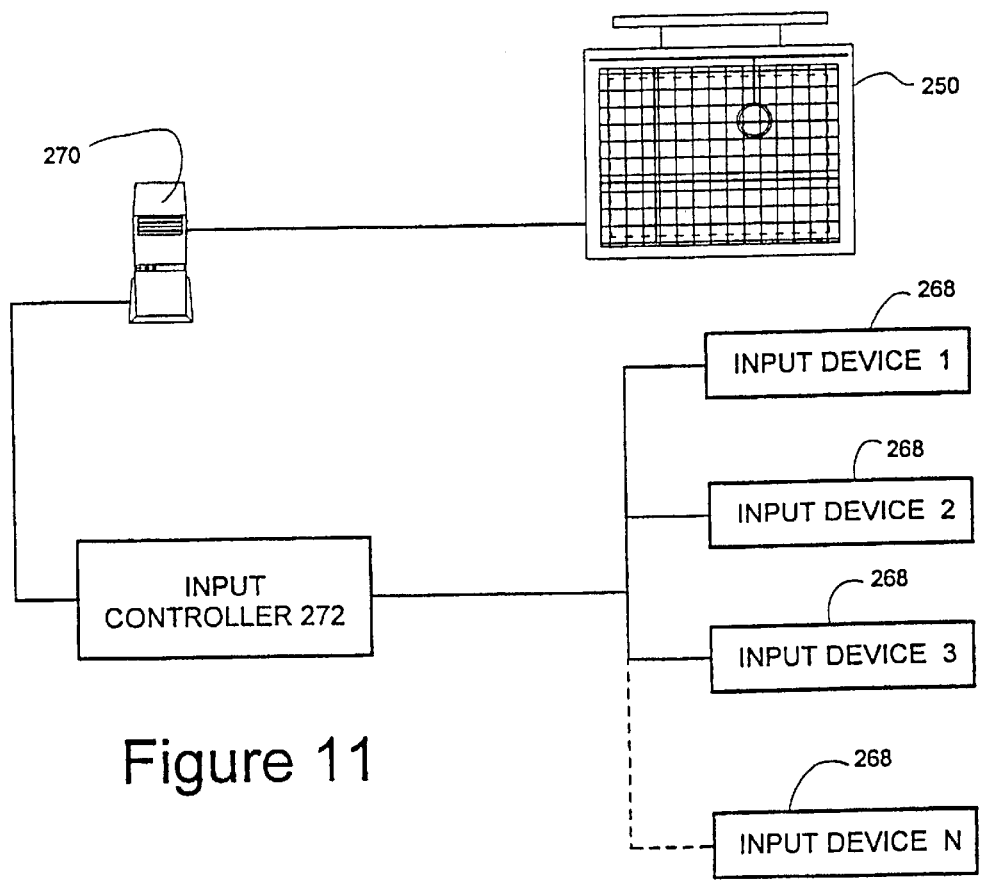
FIG. 11 is a schematic block diagram of the classroom-use display of FIG. 10 with associated input and computing devices.

As shown in FIG. 11, alternative or additional peripheral equipment which can be used includes an input device 268 for one, or more, or each member of the audience. Input device 268 may be as simple as a switch, or impulse generator, enabling the audience member to vote or provide other binary input directly to a control computer system 270 driving the display 250, for immediate or delayed onscreen display of audience input, while an instructor or conference leader continues their presentation. With each audience member so equipped, the audience can vote their opinions on the displayed material visually, while the presentation is in progress, without audibly interrupting the speaker, enabling the speaker to take in the audience consensus while speaking. Alternatively, the votes can be collected for display during a recess in the presentation, if desired.

More sophisticated input devices 268, e.g. pointing devices such as a mouse, keyboard, or drafting tablet, or even microphones can be provided, if desired, enabling the audience to write or draw directly to the display screen or otherwise provide input to the display system which can be selectively output onscreen, depending upon the software or other available controls. Also, an input controller 272 and voice recognition means, if desired, can be provided either centrally at the control computer 270 or in conjunction with a local override switch, at one or more of the audience input devices 268, to determine which input device or devices 268 is active at any given moment and, optionally an indicator, which may be alphanumeric, of the active device can be displayed onscreen.

Monochrome embodiments of the invention lend themselves to uses for signage bringing excellent viewability and low-cost to replacement of conventional cathode ray tubes in products such as airport, train and bus arrival and departure display monitors. Such displays, when used in this embodiment can have diagonal dimensions comparable to current CRT displays, namely from about 10 to about 18 inches (about 25–45 cm), with electrostatic pixel widths in the range of about 0.05–0.2 inches (about 0.1–1 cm), preferably of the order of about 0.1 inches (0.2–0.3 cm), providing excellent resolution. The implicit low cost of materials and manufacturability of the displays of the invention may enable larger displays than have heretofore been customary to be economically deployed for such purposes.

Reflective embodiments of "transflective" embodiments, can be provided with excellent contrast providing superior visibility in the bright light of airport and comparable environments. Such larger display embodiments of the invention can be used for road signs or main arrival and departure displays at airports and railroad stations, which displays may have dimensions measured in the numbers of feet, perhaps as large as 12 feet by 20 feet, or even larger. Depending upon the desired resolution and considerations regarding the drive systems and associated data processing systems, such embodiments may comprise a single integrated display panel or multiple coordinated panels. The pixel width can be scaled up proportionately, depending upon the desired resolution. Thus, a horizontal display that is 20 feet (about 6.5 meters) wide can employ pixels having a width of the order of ¼ of an inch (about 0.6 cm) to have a resolution comparable with SVGA, or about 1000 pixels wide, when viewed at an appropriate distance, for example, 30–50 feet (about 10–16 meters).

Road signage will also have dimensions measured in feet but, to judge by present-day usage, will more typically employ signs with a height in the range of from about 3 to about 10 feet (about 1–3 meters) and a width in the range of from about 3 to no more than about 20 feet (about 1–7 meters), in free-standing, pedestal mounted or bridge mounted configurations. Current programmable message electronic road sign displays used for traffic advisories typically have very poor resolution notwithstanding the use of large characters for viewability at a distance. The invention can provide such electronic road signs at low-cost with enhanced visibility and low power consumption, with the possibility of improved resolution over conventional devices being an economical optional feature. Rectangular, preferably square pixels with a width in the range of from about 0.1 to about 1.0 inches (about 0.25 to 2.5 cm), preferably about 0.25 to about 0.5 inches (about 0.6 to 1.25 cm) provide economical coverage of the desired display area with excellent resolution for the purpose.

Figure 12:
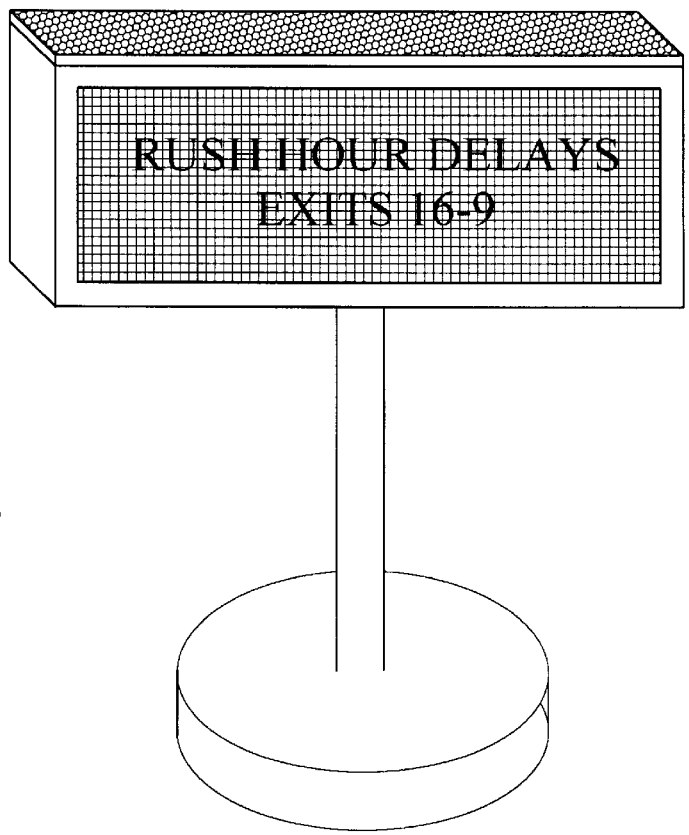
FIG. 12 is a schematic perspective view of a free-standing road sign display embodiment of the invention.
Figure 13:
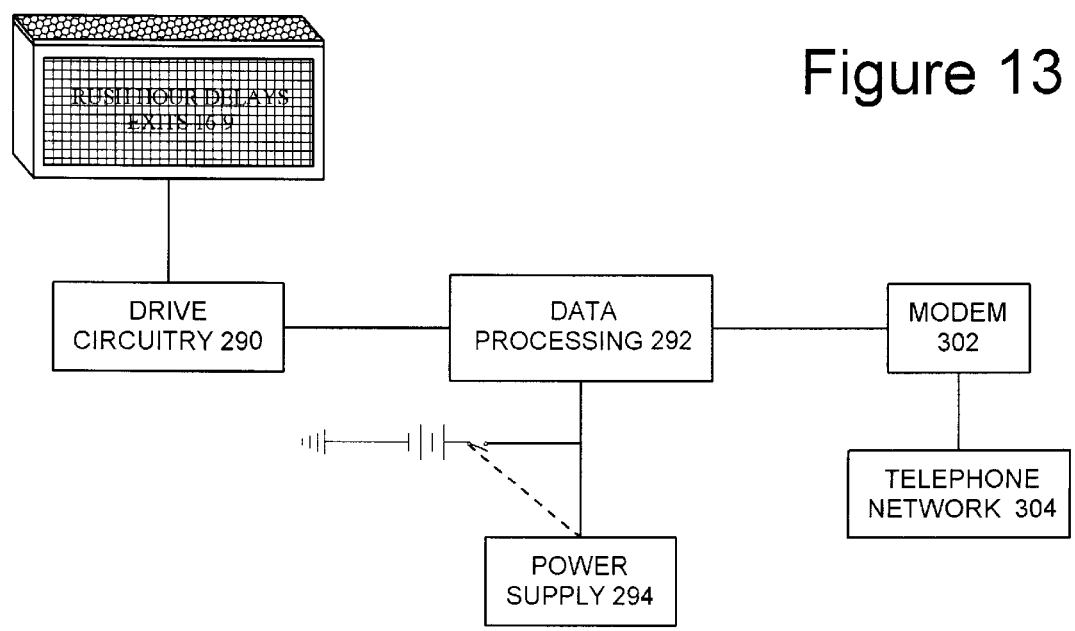
FIG. 13 is a schematic block diagram of the road sign display of FIG. 12 with associated input, output, power supply and computing devices.

Preferably, the invention is embodied for road signage as a transflective monochrome display for day and night visibility, illuminated from behind for better low-light visibility. To this end, and referring to FIGS. 12 and 13, a suitable traffic advisory display 280 can comprise a screen 282 of black movable electrodes 284 in front of a somewhat opaque, but translucent white, yellow or orange filter formed of a material having characteristics such as those of a gas station sign and being illuminated from behind so that white, yellow or orange filter areas 286, in this case composing the message "RUSH HOUR DELAYS EXITS 16-9", when displayed by retraction of blackened movable electrodes, have excellent brightness by day or night. (For ease of illustration the shading intensities are reversed in FIGS. 12 and 13, the bright, white, yellow or orange message characters being shown in solid black and the black movable electrodes 284 being shown as white squares.)

The display 280 can be incorporated i a weatherproof, mountable housing 288 mounted on a pedestal 289, or other support and accommodating desired drive circuitry 290, data processing 292 and a power supply 294, which depending upon the intended location of deployment of the display 280 may plug in to a local power supply network, be battery-powered, or include a standby battery 296 activated by switch 297 in response to failure of power supply 294. If desired, a solar panel 298 can be mounted on top of the display 280, or at another appropriate location to be used in conjunction with a battery which stores solar energy collected during the day to power the sign at night. While solar panel 298 can reduce power costs, a supplemental power source will probably also be needed to maintain continuous operation of the display. The unique, low power requirements of the inventive displays facilitate provision of a suitable power supply.

If desired, an optical sensor 300 can be provided to switch the display 280's background illumination on and off according to ambient light levels, or to switch the power supply 294 between modes, or both.

Preferably also, an external communication device, for example a modem 302, is provided along with a telephone line, dedicated line or cellular airwave connection to telephone network 304 to enable remote programming or writing of messages for display.

The invention is capable of wide application, and in addition to the above-described embodiments, can be used for applications currently fulfilled with liquid crystal display ("LCT") technology for example pocket computers, calculators, cellular phones, pagers and other information appliances as these evolve, as well as the present-day large field of laptop and notebook computers. As will be apparent from the teachings herein, the invention is well suited to provide lightweight, portable, affordable, shatterproof, hand-held displays for military and other uses.

Peripheral Equipment

In addition to the display raster and drive circuitry that have been described in some detail herein, along with certain housing features, the displays of this invention and of the parent patens and can be provided with such peripheral equipment as is conventionally employed with computers, televisions, information appliance and other such applications as are referenced herein or will be apparent to those skilled in the art. In some cases the peripheral equipment may include novel elements, or result in novel combinations, and in other cases novel features may be provided to take advantage of the beneficial characteristics of the inventive displays, or may flow from same.

Thus for example, the power supplies may include fixed or removal plugged cable connections to building power supplies or to portable power packs, or may alternatively comprise internal or external battery packs. To provide higher pixel operating voltages than are conveniently available from battery packs, voltage multipliers, power transformers or the like can be incorporated in a common housing with the display or may be provided as external peripheral equipment. Unlike power-hungry luminescent displays, the lower power requirements of the displays of the invention enable compact high voltage battery units to be employed for portable applications.

Another option is to provide a separate power supply for driving the display additional to that used for illumination and data or signal processing. Power requirements for driving a million pixel 15-in (38 cm) display can be expected to be in the range of 0.5 to 10 watts, with addition power being required for illumination and data or signal processing and with power consumption for other configurations being in proportion to the number and size of the pixels.

Power can be switched by conventional rocker, push-button, toggle, membrane or other mechanical switch means or may be operated remotely by infrared or other radiation from a remote control device or over a digital or other network from a remote location or may be switched by sensors responding to opening of a carrying case or housing or unfolding or otherwise extending a retracted display, or in response to changes in light levels.

In addition to the physical and electrical characteristics of the pixel and the electrical waveforms applied thereto to actuate the rollouts, other factors which may affect the minimum required drive voltage and the response times of the pixel are contamination of the surfaces of the spiral rollout 20 as well as ambient air conditions in the vicinity of the rollout, notably undue humidity. Accordingly, if the required operating voltage is to be minimized and fast responses are desirable, then a sealed or a hermetically sealed system may be justified, and scrupulous cleanliness should be observed in the manufacture of the pixel array, especially with regard to the rollout surfaces.

Energy-saving devices can be provided to reduce or switch off the power supply under specified conditions such as a lack of user input or lack of change in the display in a given time interval.

Manually indexable knobs, buttons or slider controls can be provided, as desired, for user adjustment of features such as brightness, contrast, color intensity and hue but, unlike conventional cathode ray tube displays, image positioning and shaping controls will probably not be necessary in most applications.

Data-processing, or signal processing and tuning devices, can be provided in a common housing with the display, or in pluggable, or otherwise connectable, associated units, as is known in the art or arts.

It will be understood that while the novel drive circuitry described in this application is preferred for use in the various embodiments of electrostatic pixel display described in this application, in the parent application and in the parent patents, nevertheless, other embodiments of drive circuitry may be employed in such displays, as will be apparent to those skill in the art, or as may become apparent through developments made subsequently to the present invention.

Display Applications

Displays according to the invention can serve a wide range of uses, providing for example: wall video; motion picture theaters where a live signal received by telephone cable is "projected" live onto the screen; portable picture video entertainment; instrument image devices capable of showing graphs, etc; heads up imaging for vehicular or training communication; dashboard (automotive); dashboard (airplane); signs, POS, interactive; scoreboards (stadium); shop windows (big city); used car lot; indoor stadium (basketball, tennis, swimming); convention center message center or information board; window blind with solar sensor; electronic curtains (for example remotely or locally controllable to choose different fabric appearances,); greenhouse shades (automatically admit proper light for plants); window blinds (privacy or radiation monitor or lace pattern); clocks for telling time, and for advertising; educational electronic blackboards with automatic video, interactive; military-command/control centers; gaming/show biz centers; fiber optic devices (such as traffic control signs); electronic video games/arcades; theme parks with interactive videos; supermarket/POS; training vehicles; telephone conferencing equipment; combination equipment including fax, phone, video, copying and audio.

While illustrative embodiments of the invention have been described above, it is, of course, understood that various modifications will be apparent to those of ordinary skill in the art. Such modifications are within the spirit and scope of the invention, which is limited and defined only by the appended claims.

I claim:

1. An electrostatic video display comprising a raster of rows of capacitively driven light-modulating pixels having distinct logical pixel addresses, and drive circuitry to provide charging pulses to specified pixels according to an intended display image, the drive circuitry providing an image refresh cycle and generating a traveling scan in which a pixel-charging activation pulse is applied to all specified ones of a horizontally contiguous pixel group, wherein the pixel group moves progressively from row to row across the raster to visit every pixel address during each refresh cycle, the number of pixels in the group being less than the number of pixels in a row so that specified row-adjacent pixels receive charging pulses at different times whereby cross-talk is inhibited.

2. A display according to claim 1 having a row dumping capacitor connected to each row of the raster to receive charging pulses form the drive circuitry and discharge to specified pixels in the row.

3. A display according to claim 1 comprising a bleed resistor for each said row of the raster wherein each pixel comprises a movable electrode and a fixed electrode and wherein each movable electrode is connected to the drive circuitry through a respective one of the bleed resistors to delay bleed-off of charge from the pixel.

4. A display according to claim 1 comprising a radio frequency choke for each pixel row to inhibit drive pulses from traveling in an unintended row.

5. A display according to claim 1 wherein each row of pixels is supplied with a biasing direct current voltage to a value below a pixel activation threshold.

6. A display according to claim 1 wherein the drive circuitry includes a power source and, for each row of pixels, a clock switch to connect the row to the power source.

7. A display according to claim 6 having a row dumping capacitor connected to each row of the raster to receive charging pulses form the drive circuitry and discharge to specified pixels in the row and a radio frequency choke for each pixel row to inhibit drive pulses from traveling in an unintended row wherein each row of pixels is supplied with a biasing d. c. voltage to a value below a pixel activation threshold, wherein each pixel comprises a movable electrode and a fixed electrode and wherein each movable electrode is connected to the drive circuitry through a bleed resistor to delay bleed-off of charge from the pixel.

8. A display according to claim 1 wherein each pixel comprises a movable electrode and a fixed electrode, the movable electrodes of each row of pixels being interconnected, wherein the fixed electrodes are connected in columns extending transversely of the pixel row, and wherein the drive circuitry further includes a column dumping capacitor for each column of pixels.

9. A display according to claim 1 wherein the drive circuitry includes a power source and, for each column of pixels, a clock switch to connect the column to the power source.

10. A display according to claim 9 wherein the drive circuitry comprises a drain resistor for each column of pixels connected in parallel across the column dumping capacitor to leak charge across the dumping capacitor and drain static build up.

11. A display according to claim 10 wherein the drive circuitry includes:

a) a power source and, for each row of pixels, a clock switch to connect the row to the power source;

b) a row dumping capacitor connected to each row of the raster to receive charging pulses form the drive circuitry and discharge to specified pixels in the row; and c) and a radio frequency choke for each pixel row to inhibit drive pulses form traveling in an unintended row;

wherein each row of pixels is supplied with a biasing d. c. voltage to a value below a pixel activation threshold, wherein each pixel comprises a movable electrode and a fixed electrode and wherein each movable electrode is connected to the drive circuitry through a bleed resistor to delay bleed-off of charge from the pixel.

12. A display according to claim 1 wherein each pixel, or every alternate pixel, in the display raster is shielded by a Faraday cage to control leakage of charge from the pixel.

13. A display according to claim 1 wherein the display raster is enclosed in a Faraday cage to shield the display from electrostatic interference.

14. A display according to claim 13 configured as a thin, flat panel computer, information appliance, television or indicator display.

15. A display according to claim 1 wherein each pixel comprises a movable electrode and a fixed electrode, the movable electrodes of each row of pixels are interconnected and the fixed electrode are connected in columns extending transversely of the pixel rows, the drive circuitry further comprising:

a) a row dumping capacitor connected to each row of the raster to receive charging pulses from the drive circuitry and discharge to specified pixels in the row;

b) a bleed resistor for each said row of the raster, each movable electrode being connected to the drive circuitry through a respective one of the bleed resistors to delay bleed-off of charge from the pixel;

c) a radio frequency choke for each pixel row to inhibit drive pulses from traveling in an unintended row;

d) a power source supplying each row of pixels with a biasing d. c. voltage at a value below a pixel activation threshold value;

e) a clock switch for each row of pixels to connect the row to the power source;

f) a radio frequency choke for each pixel row to inhibit drive pulses from traveling in an unintended row;

g) a column dumping capacitor for each column of pixels;

h) a clock switch for each column of pixels to connect the column to the power source; and i) a drain resistor for each column of pixels connected in parallel across the column dumping capacitor to leak charge across the dumping capacitor and drain static build up.

16. A display according to claim 15 comprising a housing for the display, the housing providing a Faraday cage enclosing the display and shielding the display from electrostatic interference.

* * * * *